US011563933B2

(12) United States Patent
Seregin et al.

(10) Patent No.: US 11,563,933 B2
(45) Date of Patent: Jan. 24, 2023

(54) REFERENCE PICTURE RESAMPLING WITH SWITCHABLE FILTERS

(71) Applicant: QUALCOMM Incorporated, San Diego, CA (US)

(72) Inventors: Vadim Seregin, San Diego, CA (US); Muhammed Zeyd Coban, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 229 days.

(21) Appl. No.: 16/912,660

(22) Filed: Jun. 25, 2020

(65) Prior Publication Data
US 2021/0014478 A1 Jan. 14, 2021

Related U.S. Application Data

(60) Provisional application No. 62/872,225, filed on Jul. 9, 2019.

(51) Int. Cl.
H04N 19/105 (2014.01)
H04N 19/117 (2014.01)
(Continued)

(52) U.S. Cl.
CPC ......... H04N 19/105 (2014.11); H04N 19/117 (2014.11); H04N 19/132 (2014.11);
(Continued)

(58) Field of Classification Search
CPC .. H04N 19/105; H04N 19/117; H04N 19/132; H04N 19/137; H04N 19/159;
(Continued)

(56) References Cited

U.S. PATENT DOCUMENTS 7,720,311 B1* 5/2010 Sriram ............... H04N 19/80
382/299
2016/0286219 A1* 9/2016 Rusanovskyy ...... H04N 19/117

OTHER PUBLICATIONS

Wang et al. "Adaptive Motion Vector Resolution Prediction in Block-Based Video Coding," 2015 Visual Communications and Image Processing (VCIP) (Dec. 13-16, 2015), Received from IEEEXplore, Published on Apr. 25, 2016, ISBN:978-1-4673-7314-2 (Year: 2016).*

(Continued)

Primary Examiner — Sath V Perungavoor
Assistant Examiner — Tyler B Edwards
(74) Attorney, Agent, or Firm — Polsinelli

(57) ABSTRACT

Techniques are described for video encoding and decoding using reference picture resampling with switchable filters. One example involves obtaining a current picture and a reference picture, identifying filter index information for a current block of the current picture, and determining that a first picture size value of the current picture and a second picture size value of the reference picture are different. Based on the determining that the first picture size value of the current picture and the second picture size value of the reference picture are different, performing a resampling process using a default filter index in place of a current filter index identified by the filter index information. Additional examples can use the current filter index identified by the filter index information in subsequent blocks. In various examples, the current filter index can be derived or signaled.

53 Claims, 8 Drawing Sheets

(51) Int. Cl.
*H04N 19/137* (2014.01)
*H04N 19/46* (2014.01)
*H04N 19/132* (2014.01)
*H04N 19/51* (2014.01)
*H04N 19/159* (2014.01)
*H04N 19/176* (2014.01)

(52) U.S. Cl.
CPC ......... *H04N 19/137* (2014.11); *H04N 19/159* (2014.11); *H04N 19/176* (2014.11); *H04N 19/46* (2014.11); *H04N 19/51* (2014.11)

(58) Field of Classification Search
CPC ...... H04N 19/176; H04N 19/46; H04N 19/51; H04N 19/182; H04N 19/59; H04N 19/70; H04N 19/82
See application file for complete search history.

(56) References Cited

OTHER PUBLICATIONS

Sarwer et al. "AHG 8: JVET Common test conditions for adaptive resolution change (ARC)", 15. JVET Meeting; Jul. 3, 2019-Jul. 12, 2019; Gothenburg; (The Joint Video Exploration Team of ISO/EC JTC1/SC29ANG11 and ITU-T 5G.16), No. JVET-00641 Jul. 1, 2019 (Jul. 1, 2019), XPOS02201 33 (Year: 2019).*
Chen, P., et al., (BROADCOM): "AHG19: Adaptive Resolution Change", 14. JVET Meeting, Mar. 13, 2019-Mar. 27, 2019, Geneva, (The Joint Video Exploration Team of ISO/IEC JTC1/SC29/WG11 and ITU-T SG.16), No. JVET-N0279-v1, Mar. 12, 2019 (Mar. 12, 2019), XP030256606, pp. 1-7, Retrieved from the Internet: URL: http://phenix.int-evry.fr/jvet/doc_end_user/documents/14_Geneva/wg11/JVET-N0279-v1.zip JVET-N0279-v1.docx [retrieved on Mar. 12, 2019].
Chen (BROADCOM) P., et al., AHG8: Adaptive Resolution Change , 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0303, Jul. 5, 2019 (Jul. 5, 2019), XP030219199, 8 Pages, Retrieved from the Internet: URL: http://phenix.int-evry.fr/jvet/doc_end_user/documents/15_Gothenburg/wg11/JVET-O0303-v3.zip JVET-O0303-v2.docx [retrieved on Jul. 5, 2019] Introduction, p. 1, Paragraph 1—p. 2, Figure 1 Reference Picture Scaling Process, p. 3, Paragraph 3—p. 4.
International Search Report and Written Opinion—PCT/US2020/039824—ISA/EPO—dated Sep. 24, 2020.
Luo (Alibaba-Inc) J., et al., "CE1-Related: Reference Picture Resampling Filters". 16. JVET Meeting, Oct. 1, 2019-Oct. 11, 2019, Geneva, (The Joint Video Exploration Team of ISO/IEC JTC1/SC29/WG11 and ITU-T SG.16) No. JVET-P0353, Oct. 10, 2019 (Oct. 10, 2019), XP030217046, 8 Pages, Retrieved from the Internet: URL: http://phenix.int-evry.fr/jvet/doc_errd_user/documents/16_Geneva/wg11/JVET-P0353-v6.zip JVET-P0353-v5.docx [retrieved on Oct. 10, 2019] Proposal, p. 1, Paragraph 2—p. 5, Tables 1-5.
Sarwer (Alibaba-Inc) M G., et al., "AHG 8: JVET Common Test conditions for Adaptive Resolution Change (ARC)" 15. JVET Meeting, Jul. 3, 2019- Jul. 12, 2019, Gothenburg; (The Joint Video Exploration Team of ISO/IEC JTC1/SC29/WG11 and ITU-TSG. 16 ), No. JVET-O0641, Jul. 1, 2019 (Jul. 1, 2019), XP030220133, 8 Pages, Retrieved from the Internet: URL: http://phenix.int-evry.fr/jvet/doc_end_user/documents/15_Gothenburg/wg11/JVET-O0641-v2.zip JVET-O0641-v2.docx [retrieved on Jul. 1, 2019] Introduction, p. 1, Paragraph 1—p. 2, Figure 1 picture based resampling p. 3-4.

* cited by examiner

REFERENCE PICTURE RESAMPLING WITH SWITCHABLE FILTERS

CROSS-REFERENCE TO RELATED APPLICATIONS

This application claims the benefit of U.S. Provisional Application No. 62/872,225, filed Jul. 9, 2019 and titled "Reference Picture Resampling with Switchable Filters," which is hereby incorporated by reference in its entirety and for all purposes.

FIELD

This application is related to video coding and compression. More specifically, this application relates to systems and methods of providing reference picture resampling with switchable filters.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) 2 part 2 coding, VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Systems and methods are described herein for providing improved video processing techniques. Some examples of video processing use video compression techniques with prediction to encode and decode video data efficiently. For example, a video encoder can perform prediction for a current block being encoded by comparing pixel values in the current block to a prediction block (e.g., a block that has not been encoded or that has been previously decoded). A prediction error (also referred to as the residual) can be determined as a difference between the current block and the prediction block. When performing prediction for a block in a picture using one or more blocks from one or more other pictures (referred to as inter-prediction), a motion vector can be used to indicate a location of a prediction block relative to the current block. The video encoder can apply a transform to the prediction error (e.g., a discrete cosine transform (DCT) or other suitable transform) to generate transform coefficients. After transformation, the video encoder can quantize the transform coefficients. The quantized transform coefficients and motion vectors may be represented using syntax elements, and, along with control information, form a coded representation of a video sequence. In some instances, the video encoder can entropy code syntax elements, which can further reduce the number of bits needed for representing the syntax elements.

In some examples, sample rate conversion can be applied to video data. Sample rate conversion can include resampling, downsampling, upsampling, interpolation, and/or other sample rate conversion techniques. For instance, interpolation can include piecewise constant interpolation, linear interpolation, polynomial interpolation, and spline interpolation, among other interpolation techniques. Resampling can include downsampling, upsampling, and/or a combination of downsampling and upsampling, or obtaining new samples at a different sampling rate.

In some examples, motion prediction can be enhanced with an inter-prediction block merging technique to simplify block-wise motion data signaling. Interpolation tasks are used in such context due to the displacement of objects between pictures (e.g., between a current picture and a reference picture) being independent of the pixel grid for the images. Fractional accuracy (e.g., estimating placement between pixels in images) can thus be used to more accurately capture motion. Interpolation filters can be used in video processing to implement fractional accuracy, particularly when the reference picture and the current picture being processed share a same size. Interpolation filters are used to filter image data to estimate image values at fractional positions, and this fractional position data can be used with prediction or other image processing operations.

Resampling refers to taking an image with certain samples (e.g., pixels in a certain grid), and modifying the samples (e.g., creating new pixels on a different grid) while maintaining data from the original samples. As noted above, resampling can include upsampling, where pixels from a lower resolution grid are used to create pixels in a higher resolution grid, as well as downsampling, where pixels from a higher resolution grid are used to generate pixels in a lower resolution grid. In the context of motion prediction and motion vectors described above, when the reference picture and the current picture being compared are of different sizes, reference picture resampling can be used to standardize the pixel grid as part of generating an image with fractional accuracy. When an image processing system is configured to allow reference pictures with a different size than a current picture, a filter indicated by a filter index can be suitable to process the images for interpolation filtering (e.g., fractional accuracy when the reference is a same size as a current picture) but not for fractional accuracy with reference picture resampling (e.g., fractional accuracy when the reference picture is a different size than a current picture). In some systems, for example, a smoothing filter used for fractional accuracy can generate good results with interpolation when the reference picture and the current picture are the same size, but can create poor results when used with reference picture resampling where the reference picture has a different pixel grid (e.g., a different size) than the current picture. Examples described herein improve the operation of decoding and encoding devices by identifying appropriate filter values, and generating improved encoding and decoding results during operations of the encoding and decoding devices.

In various examples, such improvements can be implemented by identifying filter index information for a current block of the current picture and determining that a first picture size value of the current picture and a second picture size value of the reference picture are different (e.g., where reference picture resampling is used). In this context, the example performs a resampling process using a default filter index in place of a current filter index identified by the filter index information (e.g., without using the current filter index).

In one illustrative example, an apparatus for processing video data is provided. The apparatus includes a memory and one or more processors implemented in circuitry. The one or more processors are configured to obtain a current picture and a reference picture. The processors are also configured to identify filter index information for a current block of the current picture and determine that a first picture size value of the current picture and a second picture size value of the reference picture are different. Based on a determination that the first picture size value of the current picture and the second picture size value of the reference picture are different, the one or more processors can perform a sample rate conversion process using a default filter index in place of a current filter index identified by the filter index information.

In another example, a method of processing video data is provided. The method includes obtaining a current picture and a reference picture. The method further includes identifying filter index information for a current block of the current picture and determining that a first picture size value of the current picture and a second picture size value of the reference picture are different. The method includes performing a sample rate conversion process using a default filter index in place of a current filter index identified by the filter index information based on a determination that the first picture size value of the current picture and the second picture size value of the reference picture are different.

In another example, a computer-readable storage medium storing instructions that when executed cause one or more processors of a device for processing video data to: obtain a current picture and a reference picture; identify filter index information for a current block of the current picture and determining that a first picture size value of the current picture and a second picture size value of the reference picture are different; and perform a sample rate conversion process using a default filter index in place of a current filter index identified by the filter index information based on a determination that the first picture size value of the current picture and the second picture size value of the reference picture are different.

In another example, an apparatus for processing video data is provided. The apparatus includes: means for obtain a current picture and a reference picture; means for identifying filter index information for a current block of the current picture; means for determining that a first picture size value of the current picture and a second picture size value of the reference picture are different; and means for performing a sample rate conversion process using a default filter index in place of a current filter index identified by the filter index information based on a determination that the first picture size value of the current picture and the second picture size value of the reference picture are different.

In some examples, methods, apparatus, and instructions stored in computer-readable storage media include: obtaining a current picture and a reference picture; identifying filter index information for a current block of the current picture; determining that a first picture size value of the current picture and a second picture size value of the reference picture are different; and performing a sample rate conversion process without using a current filter index identified by the filter index information based on a determination that the first picture size value of the current picture and the second picture size value of the reference picture are different.

In some examples, methods, apparatus, and instructions stored in computer-readable storage media include: obtaining a current picture and a reference picture; identifying filter index information for a current block of the current picture; determining that a first picture size value of the current picture and a second picture size value of the reference picture are different; and performing a sample rate conversion process using a default index value in place of a current filter index identified by the filter index information based on a determination that the first picture size value of the current picture and the second picture size value of the reference picture are different.

In some cases, the methods, apparatuses, and instructions stored in computer-readable storage media described above include storing the current filter index identified by the filter index information with the current block and using the current filter index in motion vector candidate derivation for a subsequent block based on the current filter index being identified by the filter index information.

In some cases, the methods, apparatuses, and instructions stored in computer-readable storage media described above include assigning a default value for the current filter index to replace an original value on a temporary basis when the sample rate conversion process is performed without using the current filter index to create the default filter index, and assigning the original value for the current filter index after the sample rate conversion process. In some cases, the default value for the current filter index indicates that alternative switchable filtering is not applied as part of the sample rate conversion process.

In some cases, the filter index information comprises neighbor block information and where the current filter index is derived from the neighbor block information during a merge mode motion vector candidate list derivation. In some cases, the filter index information comprises adaptive motion vector resolution (AMVR) mode signaling and the current filter index is signaled though the AMVR mode signaling. In some cases, the sample rate conversion process is a motion compensation process. In some cases, the sample rate conversion process is a resampling process. In some cases, the sample rate conversion process is an interpolation process.

In some cases, the methods, apparatuses, and instructions stored in computer-readable storage media described above operate using the reference picture for inter-prediction of the current block of the current picture. In some cases, the methods, apparatuses, and instructions stored in computer-readable storage media described above include determining that the current filter index is not used for the sample rate conversion process and replacing a value of the current filter index with a default value in response to the determining that the current filter index is not used for the sample rate conversion process. In some cases, the methods, apparatuses, and instructions stored in computer-readable storage media described above include processing the default value to determine that an alternative switchable filter is not applied. In some examples, the alternative switchable filter is a smoothing filter.

In some cases, a current filter index value is not signaled in response to a determination that the current filter index is not used in the sample rate conversion process. In some cases, the current filter index is selected from a set of filters, where a subset of the set of filters are used for performing the sample rate conversion process, and where a remaining portion of the set of filters are not usable for sample rate conversion. In some cases, the current filter index is selected using a syntax element indicating that selection of the current filter index from the remaining portion of the set of filters is prohibited.

In some cases, the sample rate conversion process includes a resampling process. In such cases, the methods, apparatuses, and instructions stored in computer-readable storage media described above include identifying a first group of filters for interpolation, and a second group of filters for resampling, where the current filter index is from the second group of filters.

In some cases, the methods, apparatuses, and instructions stored in computer-readable storage media described above include obtaining a second current picture and a second reference picture, determining that a third picture size value of the second current picture and a fourth picture size value of the second reference picture are a same size value, and based on determining that the third picture size value of the second current picture and the fourth picture size value of the second reference picture are the same size value, performing a second resampling process for a second current block using a second selected filter, where the second selected filter is from the first group of filters.

In some cases, each filter of the first group of filters and the second group of filters is identified by an associated filter index. The associated filter index indicates an associated index value from a filter set for interpolation or a filter set for resampling.

In some cases, the methods, apparatuses, and instructions stored in computer-readable storage media described above include obtaining the current filter index from a filter index by a lookup operation for a selected filter index value, where the selected filter index value is associated with the second group of filters, and where association between the selected filter index value and the second group of filters is based on determining that the first picture size value and the second picture size value are different.

In some cases, the methods, apparatuses, and instructions stored in computer-readable storage media described operate where determining that the first picture size value of the current picture and the second picture size value of the reference picture are different comprises determining at least one of: a current picture width is different from a reference picture width, and a current picture height is different from a reference picture height.

In some cases, the methods, apparatuses, and instructions stored in computer-readable storage media described above include generating an encoded video bitstream comprising the current picture and the reference picture. In some examples, the methods, apparatuses, and instructions stored in computer-readable storage media described above include sending the encoded video bitstream to a decoding device. The encoded video bitstream can be sent with signaling information. The signaling information comprises the default filter index. In some examples, the methods, apparatuses, and instructions stored in computer-readable storage media described above include storing the encoded video bitstream.

In some cases, the methods, apparatuses, and instructions stored in computer-readable storage media described above include: obtaining an encoded video bitstream comprising the current picture and the reference picture; identifying signaling information associated with the encoded video bitstream, the signaling information comprising the filter index information; and decoding the current block of the current picture from the encoded video bitstream. In some examples, decoding the current block of the current picture from the encoded video bitstream comprises reconstructing the current block based on the default filter index In some aspects, the apparatus for processing video data can include a decoding device or apparatus and/or an encoding device or apparatus. The apparatus for processing video data can be a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus for processing video data includes a camera or multiple cameras for capturing one or more images. In some aspects, the apparatus for processing video data includes a display for displaying one or more images, notifications, and/or other displayable data.

The above-described aspects relating to any of the methods, apparatuses, and computer-readable media can be used individually or in any suitable combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
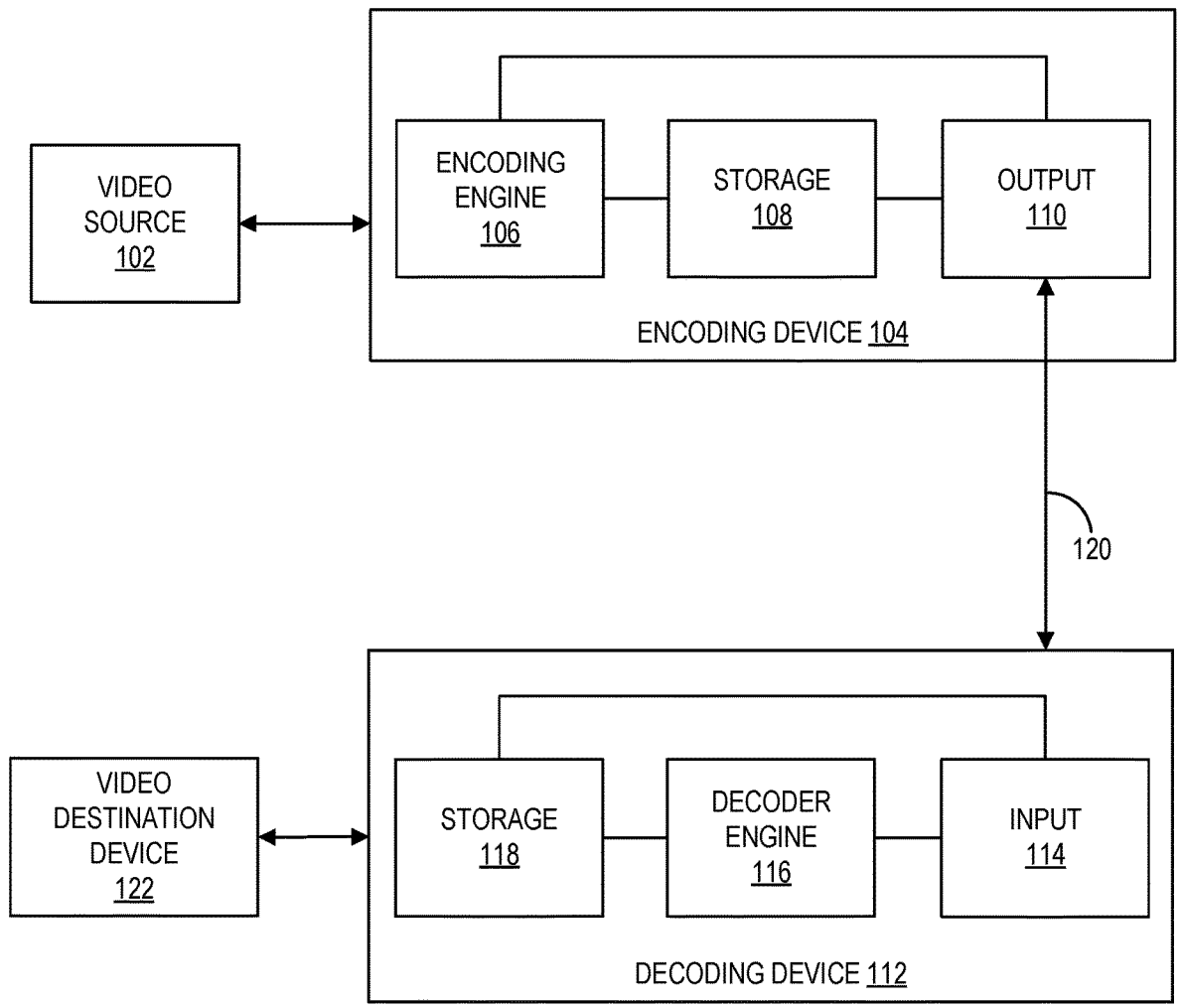
FIG. 1 is a block diagram illustrating an example of a system including an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some examples, sample rate conversion can be applied to video data. Sample rate conversion can include resampling, downsampling, upsampling, interpolation, and/or other sample rate conversion techniques. For instance, interpolation can include piecewise constant interpolation, linear interpolation, polynomial interpolation, and spline interpolation, among other interpolation techniques. Resampling can include downsampling, upsampling, and/or a combination of downsampling and upsampling, or obtaining new samples at a different sampling rate.

In certain systems, motion prediction can be enhanced with an inter-prediction block merging technique to simplify block-wise motion data signaling. Interpolation tasks are used in such context due to the displacement of objects between pictures being independent of the pixel grid for the images. Fractional accuracy (e.g., estimating placement between pixels in images) can thus be used to more accurately capture motion. This fractional accuracy can allow inference of motion data from previously decoded blocks. For interpolation and fractional reference picture samples, high precision can improve filtering. Example systems can support motion vectors with quarter-pixel accuracy, one-eighth pixel accuracy, one-sixteenth pixel accuracy, or other such accuracy depending on the system. In some examples, luma and chroma components can have different fractional accuracy in the same system. Interpolation filters can be used to process images in this context. Additionally, multiple different interpolation filters can be used in different situations (e.g., based on motion vector values). Selecting between different interpolation filters that are available is referred to herein as interpolation filter switching.

Resampling refers to taking pixel values from one image and "resampling" the data from the pixel values to generate new pixel values for a new image. As described above, resampling can include downsampling, where pixel values from a higher resolution image are used to generate an image at a lower resolution, as well as upsampling, where pixel values from a lower resolution image are used to generate an image at a higher resolution. In the context of motion prediction described above, references images and current images with different sizes (e.g., resolutions) can be used to generate motion vectors and perform motion prediction. Resampling can be used in such situations to manage the scaling difference between the reference picture and the current picture. Additionally, when the reference and current pictures are not the same size, a filter can be indicated by a filter index that is suitable for interpolation filtering without resampling but not for interpolation filtering with reference picture resampling. In some image processing systems, for example, a smoothing filter used for interpolation can create poor results when used for reference picture resampling. Examples described herein improve the operation of decoding and encoding devices by identifying appropriate filter values, and generating improved encoding and decoding results during operations of the encoding and decoding devices. In one example, this improvement is implemented by identifying filter index information for a current block of the current picture and determining that a first picture size value of the current picture and a second picture size value of the reference picture are different (e.g., that reference picture resampling is used). In this context, the example performs a resampling process using a default filter index in place of a current filter index identified by the filter index information (e.g., without using the current filter index). Additional aspects of various examples are described below.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model). A new video coding standard being developed by JVET is called Versatile Video Coding (VVC).

HEVC was finalized by the Joint Collaboration Team on Video Coding (JCT-VC) of ITU-T Video Coding Experts Group (VCEG) and ISO/IEC Motion Picture Experts Group (MPEG) in 2013. The Joint Video Experts Team (JVET), a collaborative team formed by MPEG and ITU-T Study Group 16's VCEG is working on the new VVC video coding standard. An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others).

Many embodiments described herein provide examples using the JEM model, VVC, the HEVC standard, and/or extensions thereof. However, as noted above, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 7. An example of specific details of the decoding device 112 is described below with reference to FIG. 8.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 7. An example of specific details of the decoding device 112 is described below with reference to FIG. 8.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1 [ 0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

The candidates for both modes can be derived from spatial and/or temporal neighboring blocks. For example, FIG. 2A and FIG. 2B include conceptual diagrams illustrating spatial neighboring candidates in HEVC.

Figure 2A:
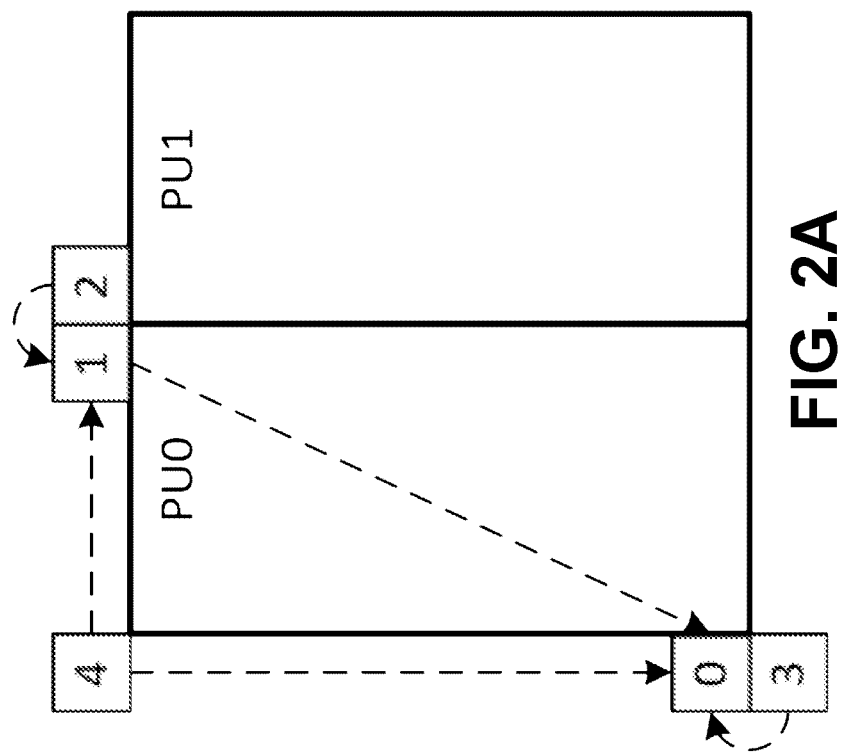
FIG. 2A is a conceptual diagram illustrating example spatial neighboring motion vector candidates for a merge mode, in accordance with some examples.
Figure 2B:
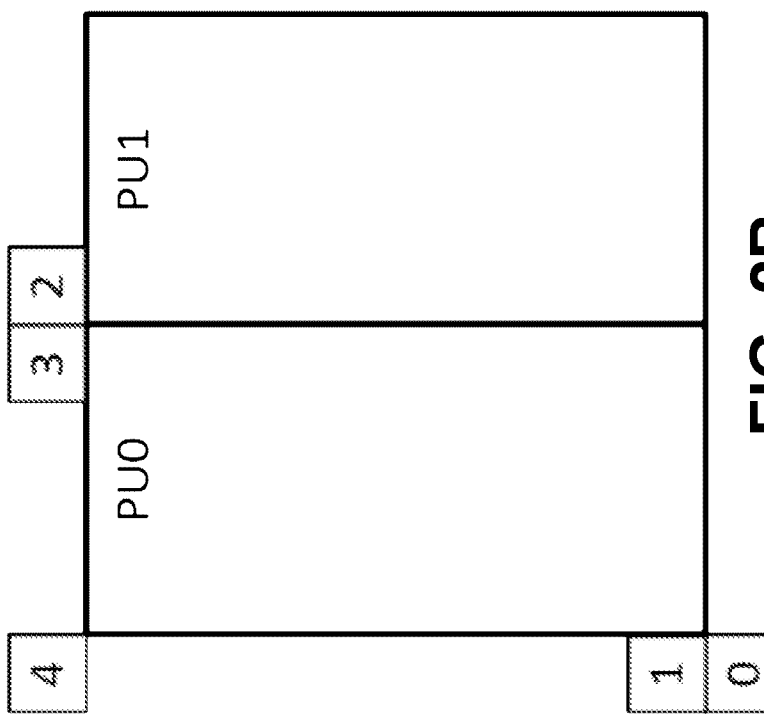
FIG. 2B is a conceptual diagram illustrating example spatial neighboring motion vector candidates for an advanced motion vector prediction (AMVP) mode, in accordance with some examples.

FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder and/or decoder can form a merging candidate list by considering merging candidates from various motion data positions. For example, as shown in FIG. 2A, up to four spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Some example described herein can use an adaptive motion vector resolution (AMVR) mode, as noted above. AMVR refers to adaptively adjusting a range or resolution of a motion vector during image processing. Use of AMVR allows different levels of precision in coding of motion vector differences, which allows for improved coding efficiency, and can involve the use of fractional sample units (e.g., half-pel or other such fractional samples at any resolution level). In some implementations, a uniform fractional sample unit, an integer sample unit, or the like may be used in the entire range, or the range of the sample unit may be set adaptively according to the region. The former may be referred to as a linear AMVR, and the latter may be referred to as a non-linear AMVR. The use of an AMVR mode can further involve explicit signaling of a filter index value (e.g., using a syntax element in a video bitstream) for use in motion compensation processing of a current image.

In the context described above, reference picture resampling (RPR) is a resampling process that can be used to allow reference picture(s) with a picture size that is different from a picture size of a current picture being encoded or decoded. When a reference picture has a different size from a current picture, a picture resampling process can be invoked to provide upsampled or downsampled versions of one of the pictures to match the size of the other picture (e.g., upsampling or downsampling the reference picture to match the current picture size). This resampling can, in some examples, be similar to operations for spatial scalability used in the scalable extension (SHVC) of the H.265/HEVC standard. The RPR process can be applied to pictures of a single layer having different sizes and/or can be applied to pictures of different layers that have different sizes. An illustrative example of applying RPR to pictures of different sizes from different layers is described below with respect to FIG. 3.

Figure 3:
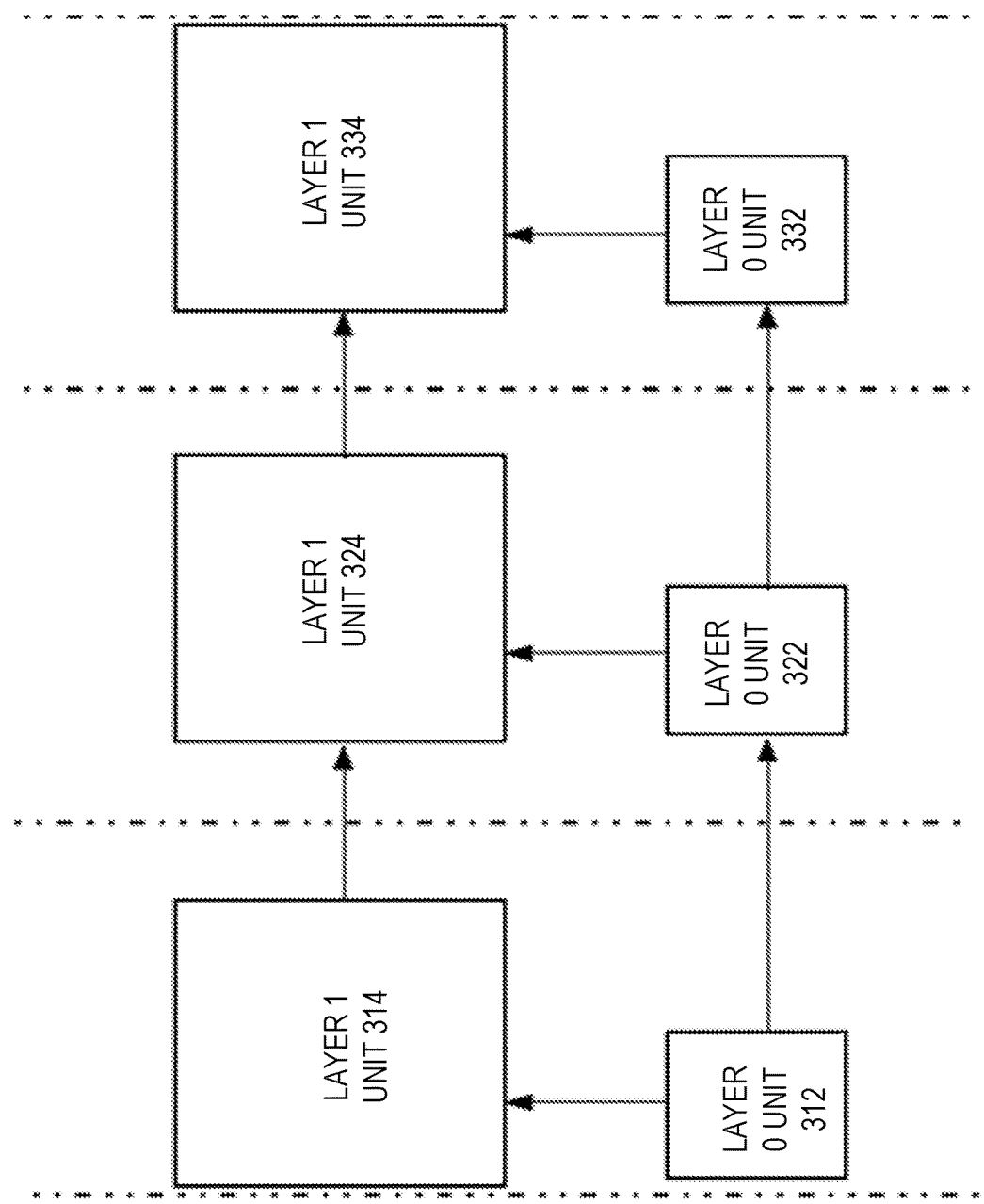
FIG. 3 is a flow diagram illustrating techniques for processing video data.

FIG. 3 is a diagram illustrating aspects of picture data in a system at different scaling values (e.g., different sizes). Pictures or data for pictures (e.g., access units) can be structured in layers. Each layer can be for picture frames with different sizes (e.g., resolutions). One such example illustrated in FIG. 3 includes two layers, and other various examples can use other numbers of layers (e.g., three layers, four layers, etc.). As noted above, pictures within a single layer can have different sizes, in which case the RPR process can be performed. In the example of FIG. 3, data for three pictures is shown, with each picture associated with two different picture sizes. A first picture is associated with layer 1 unit 314 at a first picture size, and layer 0 unit 312 at a second picture size. Similarly, a second picture is associated with layer 1 unit 324 at the first picture size, and layer 0 unit 322 at the second picture size, and a third picture is associated with a layer 1 unit 334 at the first picture size and layer 0 unit 332 at the second picture size. During signaling, reference picture lists can be constructed to identify reference pictures for use in processing a current picture. In some examples, pictures from one layer (e.g., at the first resolution) can be used as reference pictures for a current picture at a second layer (e.g., at the second resolution). In another example, a single layer may have pictures of different sizes, as noted above.

With RPR, pictures (or blocks of the pictures) of difference size (e.g., pictures from a single layer or pictures from different layers) can be used as reference pictures for blocks of the current picture. Such reference pictures can be stored in a decoded picture buffer (DPB) (e.g., using memory or reference picture storage such as picture memory 92 of FIG. 8 for a filter unit such as filter unit 91 of FIG. 8). A reference picture sampling tool can be used to generate the necessary reference data from the reference picture for processing the current picture. In some examples, this reference picture sampling tool can be part of a filter unit (e.g., filter unit 91 of FIG. 8), or in other examples can be part of any aspect of a device for encoding or decoding as described herein.

Figure 4:
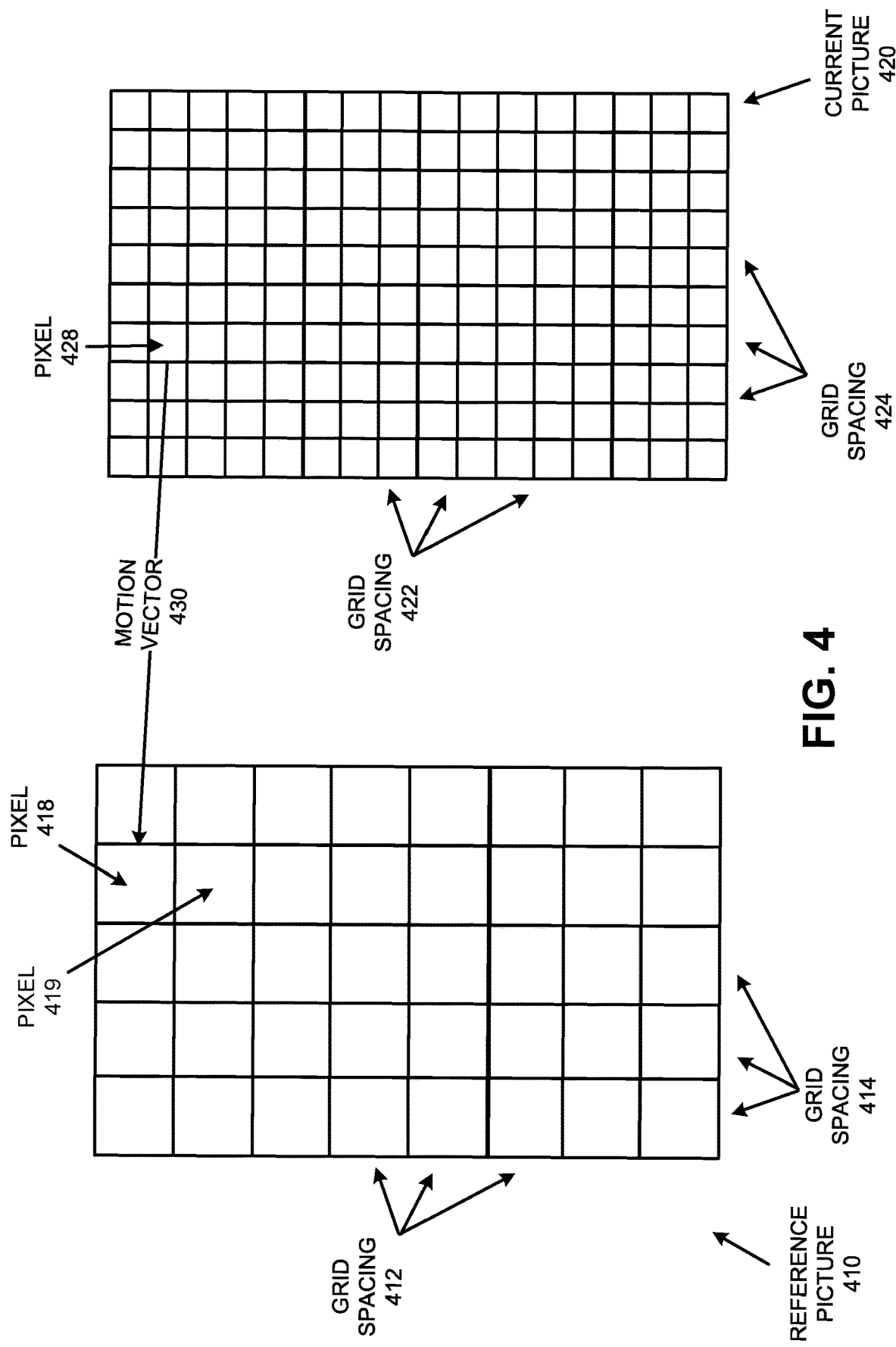
FIG. 4 is a diagram illustrating aspects of reference picture resampling in accordance with some examples.

FIG. 4 is a diagram illustrating further aspects of reference picture resampling in accordance with examples described herein. FIG. 4 includes a reference picture 410 and a current picture 420. Reference picture 410 has a first horizontal grid spacing 414 and a first vertical grid spacing 412. Current picture 420 has a second horizontal grid spacing 424 that is different than the first horizontal grid spacing 414. Current picture also has a second vertical grid spacing 422 that is different than the first vertical grid spacing 412. The first grid spacings 412 and 414 can, for example, be associated with a first layer, and the second grid spacings 422 and 424 can be associated with a second layer. Reference picture 410 can be a first layer picture that is sequential with the current picture 420 from the second layer in a video stream, with the reference picture 410 selected as a reference picture for current picture 420 as part of prediction operations.

Reference picture 410 and current picture 420 each include grids of pixels, including pixels 418 and 419 of reference picture 410 and pixel 428 of current picture 420. Each pixel can have associated data, such as color values for red, green, and blue portions of the pixel. Each color will have a data value at each pixel. Each pixel for each picture can be associated with an integer position in the grid (e.g., the size or scaling value) for the picture. A standard motion vector 430 pointing directly from one pixel to another can use the integer positions of the pixels. Fractional accuracy, however, as described above, can allow motion vector 430 to point between pixels. Half-pel accuracy could, for example, allow motion vector 430 to point half way between pixel 419 and 418. Quarter-pel accuracy allows motion vector 430 to point at three different positions between the pixels (e.g., one quarter, one half, and three quarters) as well as directly to the integer positions of the pixels.

AMVR, as described above, allows motion vector precession to be adaptively set at different fractional accuracy levels. When image processing using an AMVR mode is implemented, the MV accuracy can be adaptively selected at an integer-pel precision (e.g., where the MV is at grid points only for grid spacings 412, 414, 422, and 424, with no fractional accuracy), or at any fractional accuracy level supported by an implemented AMVR mode (e.g., allowing the MV to point between the grid points at a fractional accuracy level for grid spacings 412, 414, 422, and 424). Allowing a system to adaptively determine a level of resolution (e.g., integer resolution at the grid spacing level or a fractional resolution for accuracy between grid spacings) allows for improved coding efficiency. This improved coding efficiency can use additional syntax elements for signaling, that can further explicitly indicate a filter index for a current picture, as describe for various examples herein.

Interpolation is used to select the data values (e.g., for red, green, and blue) at the pixel position given expected motion or other changes, including intra-pixel data (e.g., from a motion vector using fractional accuracy). During processing (e.g., decoding or encoding), processing is performed for each pixel or for each sample (e.g., a luma sample and/or chroma sample) of each pixel. Filtering is performed for each pixel or each sample of each pixel, including interpolation and any resampling compensation due to RPR, to generate pixel or sample values for the current picture 420 during video data processing. In another example, interpolation and resampling filtering can be merged into one filtering process. Each pixel or sample will have an attached scaling value and motion vector during processing. As described above, different filters can be used under different circumstances (e.g., different values of motion vector 430 or different scaling values between reference picture 410 and current picture 420).

Table 1 below provides an example table of filter coefficients with a filter index for interpolation filter switching between different half-pel interpolation filters:

TABLE 1

| Fractional sample position | A | B | C | D | E | F | G | H |
|---|---|---|---|---|---|---|---|---|
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (Filter Index Value 1) | −1 | 4 | −11 | 40 | 40 | −11 | 4 | −1 |
| 8 (Filter Index Value 2) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |

TABLE 1-continued

| Fractional sample position | A | B | C | D | E | F | G | H |
|---|---|---|---|---|---|---|---|---|
| 14 | 0 | 1 | −3 | 8 | 62 | −5 | 2 | −1 |
| 15 | 0 | 1 | −2 | 4 | 63 | −3 | 1 | 0 |

Table 1 shows a table of interpolation filter coefficients for filtering at one-sixteenth fractional accuracy positions. Depending on the fractional accuracy position (e.g., fractional sample position 1-15 in the first column, with the 0 position being the non-fractional or integer position), different filter coefficients can be used (e.g., coefficients from the row corresponding to a fractional position). Additionally, at the half-pel position (e.g., fractional sample position 8 in the one-sixteenth fractional accuracy of Table 1), two interpolation filters are available and signaling can be used to switch between the filters at this level. While two filters are described by Table 1 for interpolation filter switching at the half-pel level (e.g., selecting between the filter index values 1 and 2), other examples can use more than two filters for switching, or can include additional filters for switching at any fractional position. Addition of additional filters for interpolation filter switching can increase fractional accuracy during image processing at the cost of additional signaling and processing resources.

In JVET-N0279 and JVET-O0242, which are hereby incorporated by reference in their entirety and for all purposes, RPR is proposed. In the proposal, a current picture (e.g., the picture currently being encoded or decoded) and reference pictures may have different resolutions (e.g., sizes, grid spacings, scaling values, etc.) as described above. In such cases, during motion compensation, a difference in resolution is considered when performing interpolation filtering by adjusting the interpolation filter phase. For example, in real-time video communication, allowing resolution changes within a coded video sequence without inserting an intra-predicted picture (I-picture) can not only adapt the video data to dynamic channel conditions or user preference seamlessly, but can also remove the effects caused by I-pictures. When adaptive resolution changes occur, a current picture can be predicted from reference pictures of different sizes. An illustrative example of a reference picture resampling (or scaling) process is described below.

In JVET-O0057, which is hereby incorporated by reference in its entirety and for all purposes, a switchable interpolation filter concept was proposed to VVC. In this document, one or more interpolation filters can be switched. For example, a filter index can be signaled or inferred (e.g., by the decoder) to indicate that another interpolation filter is used for a block. The filter index can be signaled on a block basis (e.g., explicitly or through half-pel AMVR mode signaling). For example, in a system with half-pel AMVR, syntax elements signaled in a bitstream can explicitly indicate a filter index to be used in processing a current block associated with the syntax element (e.g., a syntax element indicating a particular filter index value of Table 1). In examples with AMVR using fractional precision other than half-pel, similar signaling can use syntax elements configured to the particular resolution options of the AMVR implementation.

In other implementations, the filter index does not need to be signaled explicitly via syntax elements in the bitstream that specifically indicate the filter index to be used. In such other examples without explicit signaling, the filter index can be inferred (e.g., by the decoder) through a motion vector candidate in the merge-like modes, such as the merge modes described above with respect to FIGS. 2A and 2B.

In one illustrative example, a total of N filters with different characteristics (e.g., such as filter length, cut-off frequencies, transition band or the amount of ripples) can be defined. For each block, a subset of the N filters can be defined and the index of the chosen filter in the subset may be explicitly or implicitly signalled to the decoder (e.g., using a flag or a filter index value as illustrated in Table 1). The subset may be varied from one block to another based on certain criterion (e.g., hit-ratio of filters in previously coded blocks, motion vector values, scaling values, etc.)

When interpolation filter switching occurs, the filter indicated by the filter index may be suitable for interpolation purposes, but may not be useful for a picture resampling purposes (and in some cases other sample rate conversion processes). For example, a smoothing filter may not be a good resampling filter. Switching between different filters (e.g., interpolation filter switching) allows an image processing operations to create stability between images depending on the characteristics of a pixel being filtered (e.g., associated motion vectors and scaling values for a pixel in a current picture and an associated reference picture). For example, a filter index can have filter index values for different filters. In some examples, the filter to be used is signaled (e.g., using a flag) to indicate which of the filters in the index is to be used (e.g., switching between interpolation filters). In another example, the filter to be used can come from a spatial candidate (e.g., reference picture) where the filter index is stored with motion vector data and propagated from a reference picture for use with a current picture.

Methods, apparatuses, and computer-readable media are described herein that address the above-identified problem as well as other problems. In some examples, as described in more detail below, a condition check can be performed to identify whether a current picture size and a reference picture size are the same size. The condition check can be performed at different levels as detailed in below.

Figure 5:
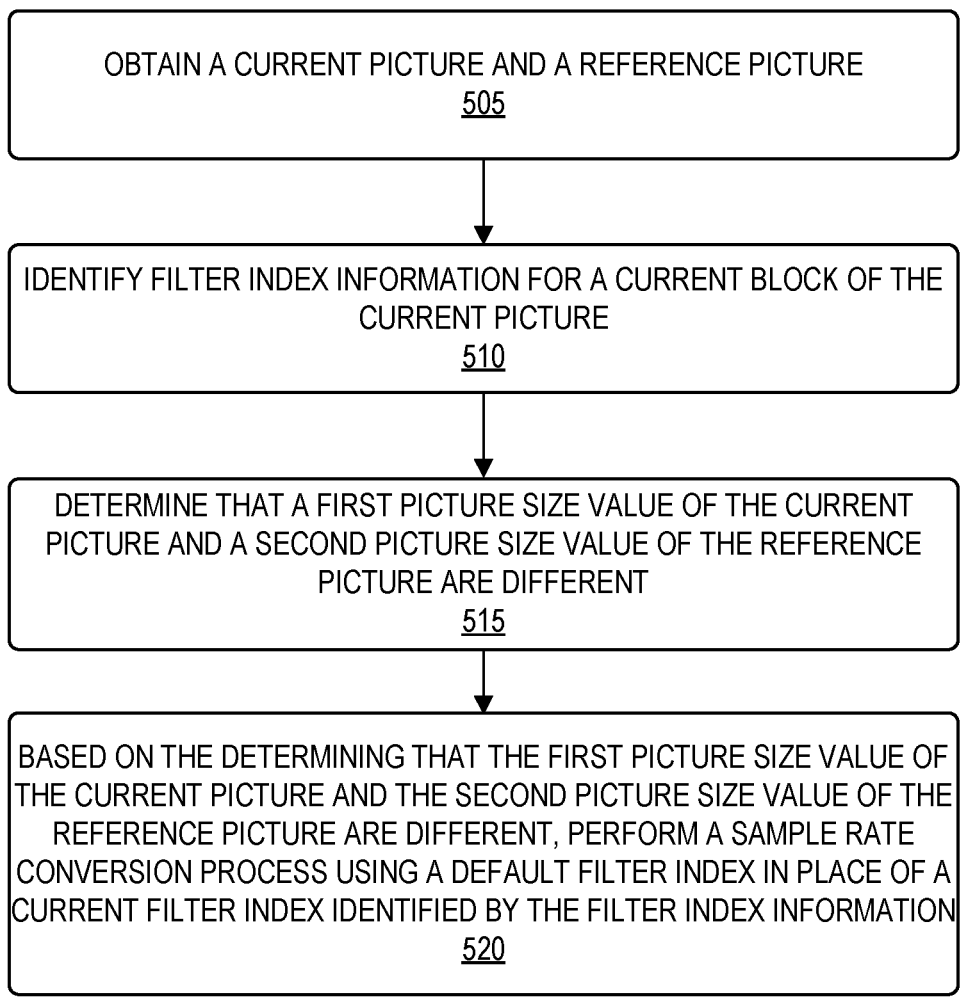
FIG. 5 is a flow diagram illustrating aspects of a method for reference picture resampling in accordance with some examples.

FIG. 5 is a flow diagram illustrating a method 500 for processing video data. In some examples, method 500 is performed by a device including a memory and one or more processors. In some examples, method 500 can be performed by an encoding device, such as device 104. In some examples, method 500 can be performed by a decoding device, such as device 112. In some examples, method 500 is embodied as instructions stored in computer readable storage that cause one or more processors to perform method 500 when the instructions are executed by the one or more processors.

At operation 505, method 500 includes obtaining a current picture and a reference picture. As described above, in various examples, the current picture and the reference picture can be divided and organized in various ways (e.g., various units, slices, etc.)

Operation 510 of method 500 includes identifying filter index information for a current block of the current picture. In different examples, this filter index information can be inferred from neighboring blocks, or can be signaled as part of AMVR. In some examples, the filter index information comprises AMVR mode signaling data where the current filter index is signaled though the AMVR mode signaling. In some examples, the filter index information comprises neighbor block information and the current filter index is then derived from the neighbor block information during a merge mode motion vector candidate list derivation. The filter index information includes motion information such as a filter index or filter index value. In a merge mode, this filter index information can be propagated or implied from neighbor blocks. With an AMVR mode, the filter index information can be explicitly signaled using AMVR signaling.

Operation 515 of method 500 includes determining that a first picture size value of the current picture and a second picture size value of the reference picture are different. In some examples, this determination can involve a width and height comparison. In other examples, any other such comparison can be used. In one example, determining that the first picture size value of the current picture and the second picture size value of the reference picture are different comprises determining at least one of: a current picture width is different from a reference picture width; and a current picture height is different from a reference picture height. This picture size check can function as a condition for changing the filter index. Depending on the picture size check and an associated changing of the filter index, propagation of the original index value (e.g., the current index value prior to be replaced if indicated by the picture size check) can be configured (e.g., by storing the original index value and replacing it for a propagation step, or by keeping it if a default value does not replace the original index value).

At operation 520, method 500 includes performing a sample rate conversion process using a default filter index in place of a current filter index identified by the filter index information. In some examples, the sample rate conversion process includes a resampling process. For instance, the operation 520 can include performing a resampling process using a default filter index in place of a current filter index identified by the filter index information. In some examples, the sample rate conversion process includes an interpolation process. The performing can be based on the determining that the first picture size value of the current picture and the second picture size value of the reference picture are different. In various examples, the sample rate conversion process (e.g., the resampling process) is performed without using the current filter index when the current and reference pictures have different size values. In some such examples, the default value for the current filter index is interpreted by a device or includes an indication that alternative switchable filtering is not applied as part of the sample rate conversion process (e.g., the resampling process).

In various examples, when the derived filter index (e.g., the current index indicated by signaling or derivation), the value stays with the block, and can be used (e.g., propagated) to subsequent blocks processed by the system. In such examples, if a default filter index value is used for a current picture (e.g., the alternative switchable filter is not used), the default filter index value is not propagated from the current picture, but the original value can be stored or the default value can be replaced with the original value after use for propagation to subsequent pictures.

In some examples, the method can further involve operations for storing the current filter index identified by the filter index information with the current block and using the current filter index in motion vector candidate derivation for a subsequent block based on the current filter index being identified by the filter index information. In some examples, the method can further involve operations for assigning a default value for the current filter index to replace an original value on a temporary basis when the sample rate conversion process (e.g., the resampling process) is performed without using the current filter index to create the default filter index and assigning the original value for the current filter index after the sample rate conversion process (e.g., the resampling process). This reassignment of the original allows the current filter index value (e.g., the original value) to be propagated to subsequent pictures, even when the current filter index value is not used for the current picture.

Some such examples can operate by determining that the current filter index is not used for the sample rate conversion process (e.g., the resampling process) and replacing a value of the current filter index with a default value in response to the determining that the current filter index is not used for the sample rate conversion process (e.g., the resampling process). Similarly, some such examples operate by processing the default value to determine that an alternative switchable filter is not applied.

Some examples can operate where a current filter index value is not signaled in response to a determination that the current filter index is not used in the sample rate conversion process (e.g., the resampling process). Some examples can operate where the current filter index is selected from a set of filters, in which case a subset of the set of filters are used for performing the sample rate conversion process (e.g., the resampling process), and a remaining portion of the set of filters are not usable for sample rate conversion (e.g., are not usable for resampling). Some such examples operate where the current filter index is selected using a syntax element indicating that selection of the current filter index from the remaining portion of the set of filters is prohibited.

The method 500 can then be repeated as needed as part of decoding or encoding operations. In some operations, method 500 will not be used for some iterations (e.g., for interpolation where no resampling or other sample rate conversion process is involved, such as when the reference picture is the same size as the current picture). As noted above, the sample rate conversion process includes a resampling process in some examples. The operations of method 500 can further include identifying a first group of filters for interpolation, and a second group of filters for resampling, where the current filter index is from the second group of filters. The operations of method 500 can further include obtaining a second current picture and a second reference picture, determining that a third picture size value of the second current picture and a fourth picture size value of the second reference picture are a same size value. Based on determining that the third picture size value of the second current picture and the fourth picture size value of the second reference picture are the same size value, the operations of method 500 can include performing a second resampling process for a second current block using a second selected filter, where the second selected filter is from the first group of filters. In some such examples, each filter of the first group of filters and the second group of filters is identified by an associated filter index, the associated filter index indicating an associated index value from a filter set for interpolation or a filter set for resampling. Some such examples further include obtaining the current filter index from a filter index by a lookup operation for a selected filter index value, where the selected filter index value is associated with the second group of filters, and where association between the selected filter index value and the second group of filters is based on determining that the first picture size value and the second picture size value are different.

In some examples, a current filter index is not used (e.g., is ignored or a resampling process or other sample rate conversion process does not depend on the value of the current filter index) in the resampling process when the current picture width is different from the reference picture width or the current picture height is different from the reference picture height. The derived or signaled filter index can stored with the current block and is used in the motion vector candidate derivation process in the next blocks. When it is determined that the derived or signaled filter index is not used, the default value for the filter index can be temporally assigned in the resampling process while the derived or signaled filter index value is kept unchanged after the resampling process. In this case, the default value can indicate that the alternative switchable filter is not applied.

In some such examples, the filter index is derived from neighbor blocks during motion vector candidate list derivation process for merge mode, as described above. In other examples, the filter index is signaled through AMVR mode. In some examples, a sample rate conversion process is motion compensation process. In some such examples, a reference picture is a reference picture used for inter prediction of the current block of the current picture.

In some examples, when it is determined that the derived or signaled filter index is not used, the filter index value can be replaced with a default value. In some such examples, the default value indicates that the alternative switchable filter is not applied, where in one example an alternative filter can be a smoothing filter. In some other examples, when it is determined that filter index is not used in the resampling process (or other sample rate conversion process), the filter index value is not signaled.

In some implementations, the processes (or methods) described herein can be performed by a computing device or an apparatus, such as the system 100 shown in FIG. 1. For example, the processes can be performed by the encoding device 104 shown in FIG. 1 and FIG. 7, by another video source-side device or video transmission device, by the decoding device 112 shown in FIG. 1 and FIG. 8, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Figure 6:
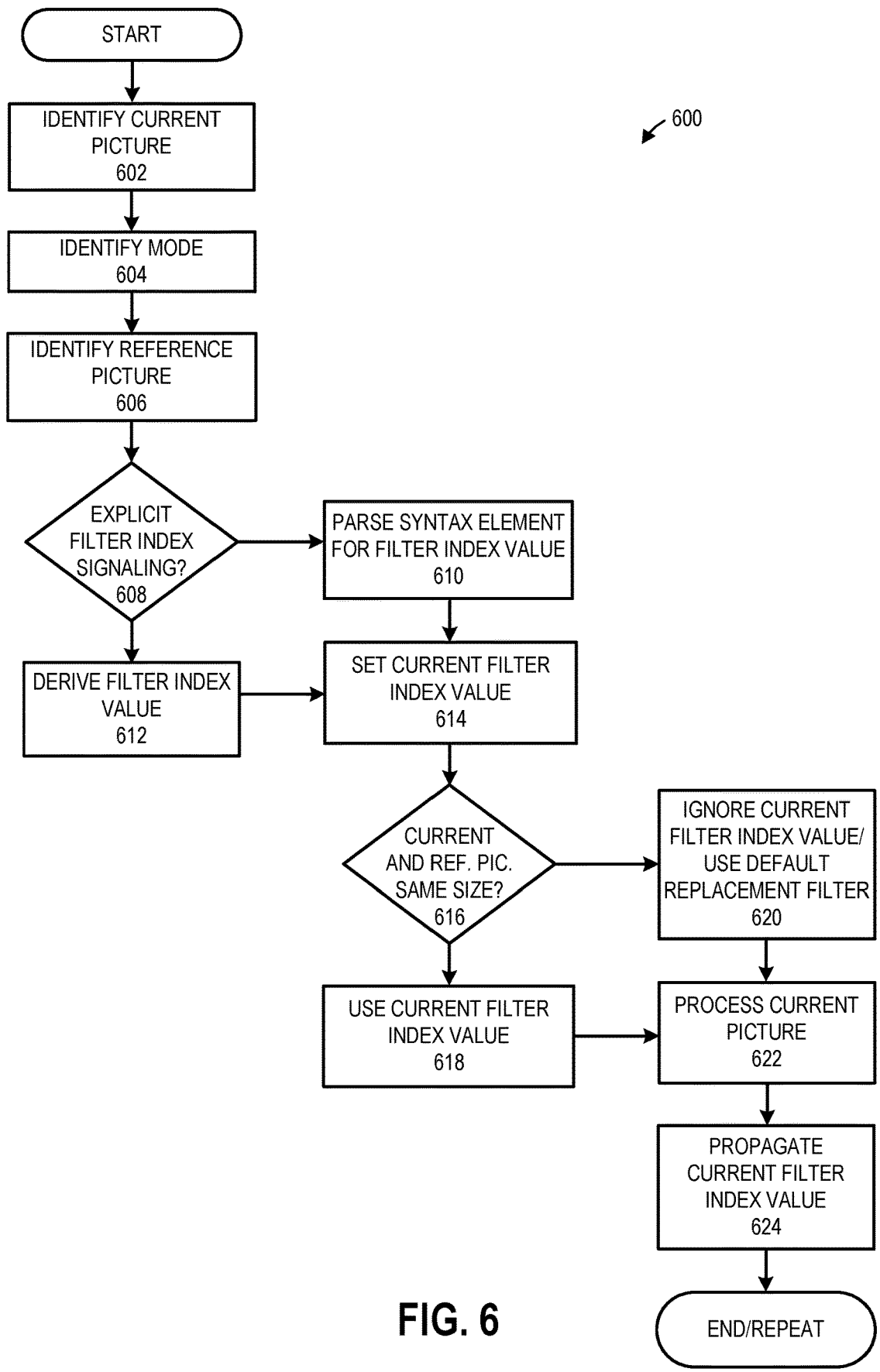
FIG. 6 is a flow diagram illustrating aspects of reference picture resampling in accordance with some examples.

FIG. 6 is a flowchart illustrating aspects of reference picture resampling in accordance with some examples, shown in FIG. 6 as method 600. Method 600 can be performed as part of an image or video processing procedure, such as a processing procedure in accordance with VVC, JEM, or other video coding standard procedures as described above.

During video processing as part of an implementation of method 600 operation 602 includes identifying a current picture. A current pictured can be identified using a POC as described above, or using any other operation to identify data associated with an image of set of images (e.g., a video) being processed.

For processing of the current picture identified in operation 602, a reference picture is identified in operation 604. As part of this identification, one or more reference pictures or reference picture candidates (e.g., from a DPB) can be selected for a reference picture list (e.g., using a POC) as described in detail above and below. Depending on the implementation, an individual reference picture can then be selected from the reference picture list for use in processing aspects of the current picture. In some implementations, different references pictures can be used for processing different portions of a current picture, but during processing, data from an individual reference picture (e.g., image data used to create motion vectors such as motion vector 430 using reference picture 410) is used.

Additionally, during video processing in accordance with method 600, various different modes can be used as part of video processing. These can include different modes for motion prediction as described above, such as AMVR and merge modes. In different implementations, these modes can change during processing of an individual image, parts of an image, or groups of images.

Different processing modes can signal information for filters to be used in processing the current picture in different ways. For example, as described herein an AMVR can explicitly signal syntax elements indicating a filter index value identifying information about a filter to be used in processing the current image. By contrast, a merge mode can operate without explicit filter index signaling by deriving the filter index information from other pictures (e.g., adjacent pictures, reference pictures, etc.) In operation 608, the appropriate operation for identifying the filter index information is determined, and the processing operation proceeds with the appropriate operations to gather the filter index information. If explicit filter index signaling is used, then in operation 610, the syntax elements of the explicit signaling are parsed to gather the filter index information (e.g., a value of a filter index). If explicit filter index signaling is not used, then in operation 612, the filter index information is derived (e.g., propagated from an adjacent image or image portion).

Once the filter index information has been gathered, either in operation 610 or in operation 612, the filter index information is used to set a current filter index value in operation 614. For example, in an implementation using Table 1, the filter index value can be set to one of the two filter index values associated with the half-pel fractional index position based on the filter index information.

Operation 616 includes a condition check, which is used to select an appropriate filter depending on whether resampling is used. The condition check involves comparing a size of the current picture and the reference picture identified in operation 604. As described herein, this condition check can involve comparing a horizontal size, a vertical size, a resolution values, or any other such information associated with size of the current picture and the reference picture. In some examples, the condition check (e.g., comparing a reference and current picture size or scaling) can be performed on a block basis. For instance, the condition check can be performed to check whether the current picture containing the block and a reference picture indicated in the block by a reference index have the same picture size or if they do not have the same size. In some examples, the condition check can be performed on a slice, tile, sub-picture, or other group of blocks level. For instance, the condition check can check whether any reference picture available for inter prediction and a current picture have the same size.

In some examples, the condition can be checked at a sequence level, for example to check whether a possibility of having different picture sizes is possible. In one example, it can be indicated in a parameter set (e.g., by a flag in a PPS, SPS, and/or VPS) whether picture resampling can be applied.

In some cases, when picture size is derived (e.g., for both current and reference pictures), the size can be a decoded picture size or cropped picture size. For example, a conformance window can be signaled in the bitstream and can be applied by a decoder or media player to crop the decoded picture to the cropped picture size. In some cases, the picture size for the condition check can be derived based on the decoded picture size and various offsets (e.g., left offset, right offset, top offset, and/or bottom offset). The decoded picture size and/or the offsets can be signaled in a parameter set (e.g., PPS, SPS, and/or VPS) or elsewhere (e.g., in an SEI message, slice header, or other signaling mechanism). In this case, a scaling ratio for resampling can be derived considering the picture size of the current picture and a size of a reference picture with applied offsets. In some implementations, the offsets can be similar to scaling offsets used in the HEVC standard (e.g., in the scalable extension). This scaling ratio and/or the size values for the current picture and the reference picture can then be used in determining which filters are applied in processing the current picture. The techniques described herein can use any method of checking whether a current picture size and a reference picture size are the same size.

Depending on the result of operation 616, the current image can then be processed in different ways (e.g., using different filters). If the current and reference pictures are identified as the same size, then in operation 618, the current index value (e.g., as signaled or derived above) is used in processing the current image.

When the current picture and the reference picture are not the same size, then in operation 620, the current filter index value set in operation 614 is ignored. This can involve use of a default filter value that is set within the system for filtering involving reference picture resampling, or a default filter loop for operations where this checking condition is true. In some examples, if it is identified that the checking condition is true (e.g., picture sizes of the current picture and a reference, or one or both reference pictures in bi-prediction are different), then the use of switchable interpolation filter(s) can be disabled on a sequence level in SPS, a picture level through PPS signaling, on a slice and/or tile level, and/or on a block level. This disabling of switchable interpolation filtering (e.g., the use of the set current filter index value when switchable interpolation filtering is used within a system) can be considered as the selection of the default filter or any replacement filter for the switchable interpolation filter set in operation 614.

Regardless of which filter is selected, the current picture is processed using the selected filter in operation 622. This processing can be part of a coding loop that filters different portions of the current image, and so depending on the implementation, the operations of method 600 can be repeated and looped in different ways to processes the current image or portions of the current image using different filters. In the example of method 600, operation 624 includes propagating the current filter index value so that this information is available for use with a subsequent block if needed. This can involve generating explicit signaling, or can involve storing the current filter index value so that it can be accessed during a subsequent iteration of operation 612 to derive a filter index value (e.g., when the current picture or portion of the current picture becomes an adjacent or reference picture for a subsequent current picture being processed). Method 600 can then end and can be looped for processing of a video stream. It will be apparent that method 600 can be implemented with additional repeated or intervening operations, depending on how the use of switchable interpolation filtering is used (e.g., with structures for switchable interpolation filtering to be disabled on a sequence level in SPS, a picture level through PPS signaling, on a slice and/or tile level, and/or on a block level). Additionally, during certain modes or processing operations, switchable interpolation filtering may not be used (e.g., selection of the single quarter-pel or other values other than the half-pel index values of Table 1 with switchable interpolation filtering), and so method 600 may not be used for portions processing a video when it is used for other portions of the same video.

In some cases, when the use of switchable interpolation filter(s) is disabled on a block level (e.g., when it is identified that the checking condition is true), a syntax element indicating a filter index (e.g., half-pel AMVR mode signaling, where a different half-pel interpolation is implicitly implied) is not signaled for a block. In such cases, the syntax elements associated with the switchable filtering, for example a filter index, of half-pel AMVR to indicate a different interpolation filter, are conditioned on the picture size check (e.g., whether a current picture size and a reference picture size are the same size).

In some cases, when the use of switchable interpolation filter(s) is disabled on a block level (e.g., when it is identified that the checking condition is true), if a filter index or use of a different filter (e.g., through, for example, half-pel AMVR signaling or in a merge mode or other merge-like modes) is signaled or inferred from the neighboring blocks, the filter index is modified and set to a default filter index value for the derived motion vector candidate from a neighbor block. In one example, the default filter may indicate that switchable filter is not applied. In accordance with various examples, a selected filter can be indicated either explicitly or implicitly. In some examples, an explicit syntax element is signaled via AMVR mode signaling. In other examples, the filter is implied, derived, or propagated from a neighbor block or reference block. When the signaled (e.g., explicitly or implicitly) filter index is not used due to switchable interpolation filtering being disabled, a default filter index value can be used. This default filter can indicate that switchable filtering is not used (e.g., as part of the process for disabling switchable interpolation filtering when it is not allowed).

In some cases, when the use of switchable interpolation filter(s) is disabled on a block level (when it is identified that the checking condition is true), if a filter index (or use of different filter through, for example, half-pel AMVR signaling) is inferred from the neighboring blocks, for example, in a merge mode or other merge-like modes, the filter index (or implicit signaling through, for example, half-pel AMVR mode) is derived from the neighbor blocks, but during the resampling process, the derived filter index is ignored, and a resampling filter is applied even if it may indicate that switchable filtering should be used. The derived filter index for a current block can be stored with the block and can be used for subsequent blocks (after the current block), in which case the filter index propagates.

In some examples, extending the above idea in cases when a filter can be selected from a set of filters (e.g., the two half-pel filters of Table 1) only a sub-set of filters may be used for resampling, and other filters not usable for resampling either are restricted from being chosen (in one example, syntax element indicating such a selection may be prohibited based on the condition of the picture size being different) or such a selection is ignored when the resampling process is performed.

In some examples, two groups or sets of filters may be provided, where one group of filters is used for interpolation (e.g., for processing operations 622 using the filter selected in operation 618) and another group of filters is used for resampling (e.g., processing operation 622 using the filter selected in operation 620). In such examples, if switching of the filter is indicated, the filter is selected from a group based on the condition that picture sizes are different, i.e. resampling is performed. For example, a filter index can indicate to use a filter with that filter index from a filter set (or group), where the set (or group) is identified based on whether only interpolation or resampling is performed for the block.

In a more detailed example, assuming there is a filter set for interpolation (denoted as interpolationSet) and another filter set for resampling (denoted as resamplingSet). A filter set may have one filter or more than one filter (the size of filter set can be 1 or greater than 1). A filter index with a value offilterIndex can be selected to be used in a block. A filter, which is used in the block, is obtained from a filter set by looking up a filter with the index filterIndex. The filter may come from either interpolationSet or resamplingSet set, and the filter set is identified based on the condition whether a current picture and a reference picture sizes are the same. If the current picture and the reference picture sizes are the same (in which case no resampling is needed), then the filter set is identified as interpolationSet. If the current picture and the reference picture sizes are different (in which case resampling is performed), then the filter set is identified as resamplingSet. An advantage of this technique is that there is no need to change filter index signaling and filter index inference (e.g., the filter index value can propagate between interpolated or resampled neighbor blocks), and only the final filter is selected from a set based on the picture size condition.

An illustrative example of a reference picture resampling (or scaling) RPR process will now be described. As noted above, when there is a resolution change (e.g., within a coded video sequence (CVS)), a picture may have a different size from one or more of its reference pictures. The RPR process can be performed to normalize all motion vectors to the current picture grid instead of their corresponding reference picture grids. Such a process can be beneficial to keep the design consistent and make resolution changes transparent to the motion vector prediction process. Otherwise, neighboring motion vectors pointing to reference pictures with different sizes may not be used directly for spatial motion vector prediction due to the different scale.

When a resolution change happens, both the motion vectors and reference blocks can be scaled while doing motion compensated prediction. In some cases, the scaling range is limited to [⅛, 2] (e.g., the upscaling is limited to 1:8 and downscaling is limited to 2:1). Here, upscaling (or upsampling) refers to the case where the reference picture is smaller than the current picture, while downscaling (or downsampling) refers to the case where the reference picture is larger than the current picture. The scaling process is described in more detail below.

For luma blocks, the scaling factors and their fixed-point representations can be defined as:

$$\text{hori\_scale\_fp} = \frac{(width_{ref} \ll 14) + \left(\frac{width_{cur}}{2}\right)}{width_{cur}}, \quad \text{Equation (1)}$$

$$\text{vert\_scale\_fp} = \frac{(height_{ref} \ll 14) + \left(\frac{height_{cur}}{2}\right)}{height_{cur}}. \quad \text{Equation (2)}$$

The RPR process can include two parts, including: (1) mapping the upper left corner pixel of the current block to the reference picture; and (2) using the horizontal and vertical step sizes to address the reference locations of the current block's other pixels. In some cases, if the coordinate of the upper left corner pixel of the current block is (x, y), the subpel location (x', y') in the reference picture pointed to by a motion vector (mvX, mvY) in units of $\frac{1}{16}^{th}$ pel is specified where the horizontal location in the reference picture is:

$$x' = ((x \ll 4) + mvX) \cdot \text{hori\_scale\_fp}, \quad \text{Equation (3)}$$

and x' is further scaled down to only keep 10 fractional bits:

$$x' = \text{Sign}(x') \cdot ((\text{Abs}(x') + (1 \ll 7)) \gg 8) \quad \text{Equation (4)}$$

Similarly, the vertical location in the reference picture is:

$$y' = ((y \ll 4) + mvY) \cdot \text{vert\_scale\_fp}, \quad \text{Equation (5)}$$

and y' is further scaled down to:

$$y' = \text{Sign}(y') \cdot ((\text{Abs}(y') + (1 \ll 7)) \gg 8) \quad \text{Equation (6)}$$

At this point, the reference location of the upper left corner pixel of the current block is at (x', y'). The other reference subpel/pel locations can be calculated relative to (x', y') with horizontal and vertical step sizes. Those step sizes can be derived with $\frac{1}{1024}$-pel accuracy (or other pel accuracy) from the above horizontal and vertical scaling factors as follows:

$$x\_step = (\text{hori\_scale\_fp} + 8) \gg 4, \quad \text{Equation (7)}$$

$$y\_step = (\text{vert\_scale\_fp} + 8) \gg 4 \quad \text{Equation (8)}$$

In one example, if a pixel in the current block is i-column(s) and j-row(s) away from the upper left corner pixel (or sample), its corresponding reference pixel's horizontal and vertical coordinates are derived by:

$$x'_i = x' + i * x\_step, \quad \text{Equation (9)}$$

$$y'_j = y' + j * y\_step \quad \text{Equation (10)}$$

In subpel interpolation, $x'_i$ and $y'_j$ may need to be broken up into full-pel parts and fractional-pel parts as follows, where the full-pel parts for addressing reference block are equal to:

$$(x'_i + 32) \gg 10, \quad \text{Equation (11)}$$

$$(y'_j + 32) \gg 10 \quad \text{Equation (12)}$$

The fractional-pel parts used to select interpolation filters are equal to $$\Delta x = ((x'_i + 32) \gg 6) \& 15, \quad \text{Equation (13)}$$

$$\Delta y = ((y'_j + 32) \gg 6) \& 15 \quad \text{Equation (14)}$$

Once the full-pel and fractional-pel locations within a reference picture are determined, the existing motion compensation interpolators can be used without any additional changes. The full-pel location will be used to fetch the reference block patch from the reference picture and the fractional-pel location will be used to select the proper interpolation filter.

An example of an RPR process for chroma blocks is now described. For instance, when the chroma format is 4:2:0, chroma motion vectors have $\frac{1}{32}$-pel accuracy. In this example, the scaling process of chroma motion vectors and chroma reference blocks is similar as that for luma blocks, except a chroma format related adjustment is introduced.

When the coordinate of the upper left corner pixel of the current chroma block is ($x_c$, $y_c$), the initial horizontal and vertical locations in the reference chroma picture are $$x_c' = ((x_c \ll 5) + mvX) \cdot \text{hori\_scale\_fp}, \quad \text{Equation (15)}$$

$$x_c' = ((y_c \ll 5) + mvY) \cdot \text{vert\_scale\_fp}, \quad \text{Equation (16)}$$

where mvX and mvY are the original luma motion vector but now should be examined with $\frac{1}{32}$-pel accuracy. $x_c'$ and $y_c'$ are further scaled down to keep $\frac{1}{1024}$ pel accuracy as follows:

$$x_c' = \text{Sign}(x_c') \cdot ((\text{Abs}(x_c') + (1 \ll 8)) \gg 9), \quad \text{Equation (17)}$$

$$y_c' = \text{Sign}(y_c') \cdot ((\text{Abs}(y_c') + (1 \ll 8)) \gg 9) \quad \text{Equation (18)}$$

Compared to the associated luma equations, the above right shift is increased by one extra bit.

The step sizes used can be the same as for luma. For a chroma pixel at (i, j) relative to the upper left corner pixel, its reference pixel's horizontal and vertical coordinates are derived by:

$$x_{c,i}' = x_c' + i * x\_step, \quad \text{Equation (19)}$$

$$y_{c,j}' = y_c' + j * y\_step \quad \text{Equation (20)}$$

In subpel interpolation, $x_{c,i}'$ and $y_{c,j}'$ are also broken up into full-pel parts and fractional-pel parts, and the full-pel parts for addressing reference block are equal to:

$$(x_{c,i}' + 16) \gg 10, \quad \text{Equation (21)}$$

$$(y_{c,j}' + 16) \gg 10 \quad \text{Equation (22)}$$

The fractional-pel parts used to select interpolation filters are equal to:

$$\Delta x = ((x_{c,i}' + 16) \gg 5) \& 31, \quad \text{Equation (23)}$$

$$\Delta y = ((y_{c,j}' + 16) \gg 5) \& 31 \quad \text{Equation (24)}$$

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This destination device may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 7:
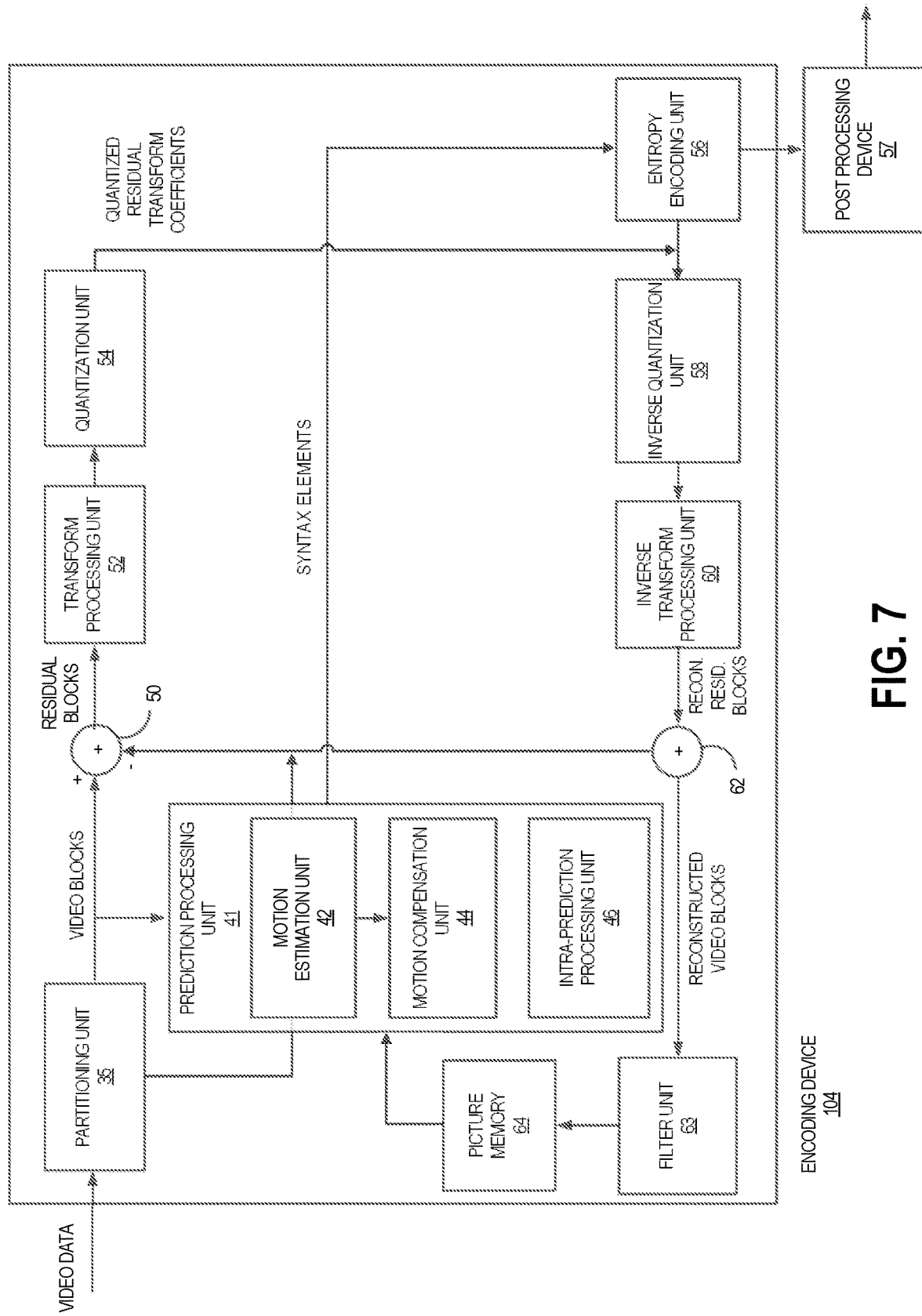
FIG. 7 is a block diagram illustrating an example video encoding device, in accordance with some examples.
Figure 8:
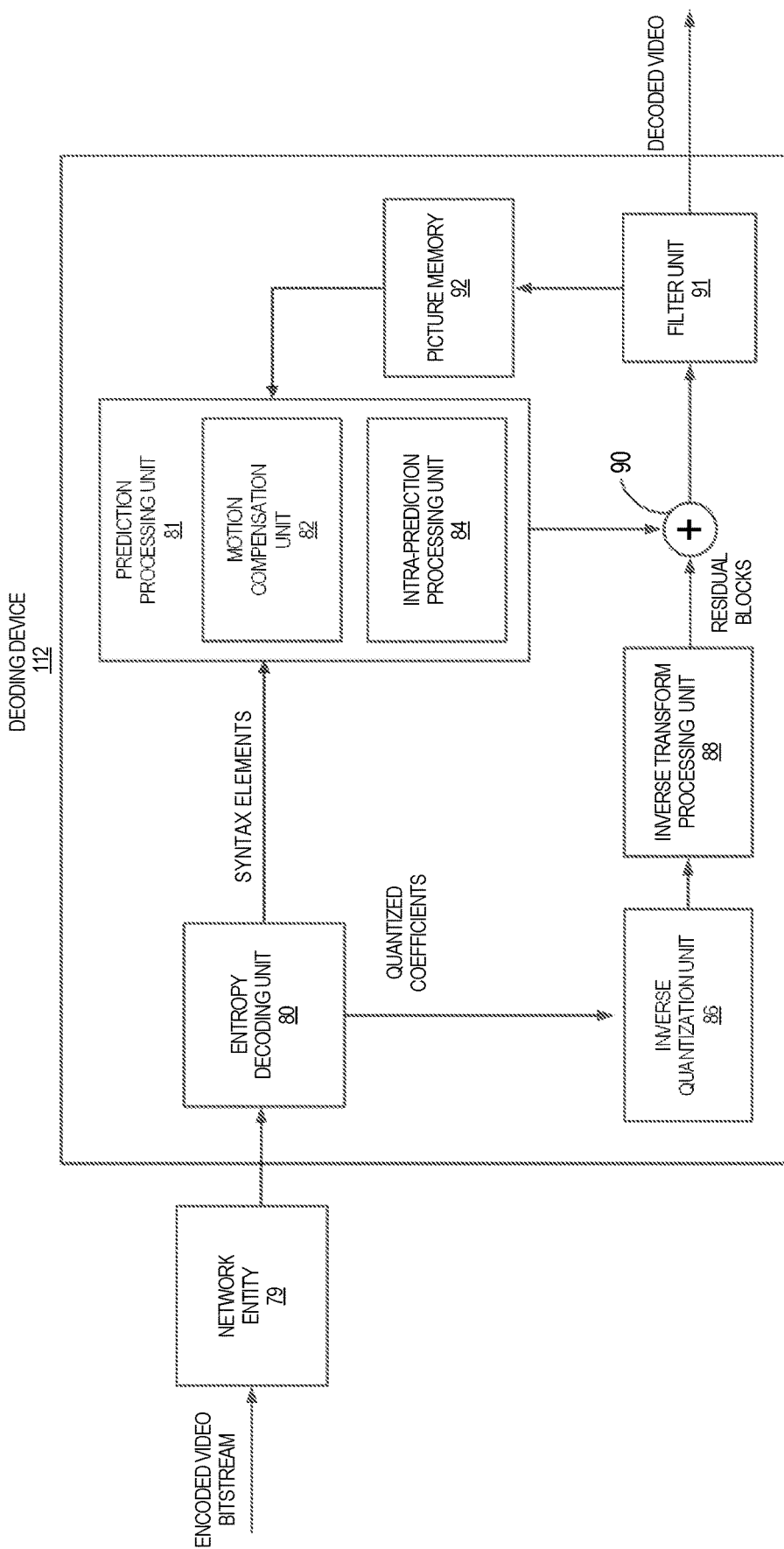
FIG. 8 is a block diagram illustrating an example video decoding device, in accordance with some examples.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 7 represents an example of a video encoder configured to perform any of the techniques described herein, including the method 500 described above with respect to FIG. 5. In some cases, some of the techniques of this disclosure may also be implemented by post processing device 57.

FIG. 7 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 8 represents an example of a video decoder configured to perform any of the techniques described herein, including the method 300 described above with respect to FIG. 3.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1: A method of processing video data, the method comprising: obtaining a current picture of video data; determining a size of the current picture is different than a size of at least one reference picture; determining use of switchable interpolation filtering is disabled based on the size of the current picture being different than the size of the at least one reference picture; and performing reference picture resampling of the at least one reference picture based on the size of the current picture being different than the size of the at least one reference picture.

Example 2. The method of example 1, wherein determining the size is performed on a block basis.

Example 3. The method of example 1, wherein determining the size is performed on a slice basis.

Example 4. The method of example 1, wherein determining the size is performed on a tile basis.

Example 5. The method of example 1, wherein determining the size is performed on a sub-picture basis.

Example 6. The method of example 1, wherein determining the size is performed at a sequence level.

Example 7. The method of any one of examples 1 to 6, wherein the size of the current picture is a decoded picture size of the current picture.

Example 8. The method of any one of examples 1 to 6, wherein the size of the current picture is a cropped picture size of the current picture after applying one or more conformance windows.

Example 9. The method of any one of examples 1 to 8, wherein the size of the reference picture is determined based on a decoded picture size of the current picture and one or more offsets.

Example 10. The method of any one of examples 1 to 9, further comprising: determining a scaling ratio for performing the reference picture resampling based on the size of the current picture and a size of a reference picture with applied offsets.

Example 11. The method of any one of examples 1 to 10, wherein one or more syntax elements associated with the switchable interpolation filtering are not signaled for a block with an encoded video bitstream based on the switchable interpolation filtering being disabled at a block level.

Example 12. The method of example 11, wherein the one or more syntax elements associated with the switchable interpolation filtering include a syntax element indicating a filter index for a block of the current picture.

Example 13. The method of any one of examples 1 to 12, wherein, when the switchable interpolation filtering is disabled at a block level and when a filter index for a block is inferred from one or more neighboring blocks of the block, the filter index is modified and set to a default filter index for a derived motion vector candidate from a neighboring block of the block.

Example 14. The method of example 13, wherein the default filter index indicates that switchable interpolation filtering is not applied.

Example 15. The method of any one of examples 13 or 14, wherein the default filter index is ignored for the block and is stored with the block for use for one or more subsequent blocks.

Example 16. The method of any one of examples 1 to 15, further comprising generating an encoded video bitstream including the current picture.

Example 17. The method of any one of examples 1 to 15, further comprising: decoding the current picture.

Example 18. An apparatus comprising a memory configured to store video data and a processor configured to process the video data according to any of examples 1 to 17.

Example 19. The apparatus of example 18, wherein the apparatus includes an encoder.

Example 20. The apparatus of example 18, wherein the apparatus includes a decoder.

Example 21. The apparatus of any one of examples 18 to 20, wherein the apparatus is a mobile device.

Example 22. The apparatus of any one of examples 18 to 21, further comprising a display configured to display the video data.

Example 23. The apparatus of any one of examples 18 to 22, further comprising a camera configured to capture one or more pictures.

Example 24. A computer readable medium having stored thereon instructions that when executed by a processor perform the methods of any of examples 1 to 17.

Example 24. A method of processing video data, the method comprising: obtaining a current picture of video data; determining whether a size of the current picture is different than a size of at least one reference picture; obtaining a filter index indicating a filter to select from a first set of filters or a second set of filters, the first set of filters including one or more interpolation filters, and the second set including one or more filters for performing reference picture resampling of the at least one reference picture; and determining whether to select the filter from the first set of filters or the second set of filters based on whether the size of the current picture is different than the size of the at least one reference picture.

Example 25. The method of example 24, further comprising: determining the size of the current picture and the size of the at least one reference picture are a same size; and selecting the filter from the first set of filters based on determining the size of the current picture and the size of the at least one reference picture are a same size.

Example 26. The method of example 24, further comprising: determining the size of the current picture is different than the size of the at least one reference picture; and selecting the filter from the second set of filters based on determining the size of the current picture is different than the size of the at least one reference picture.

Example 27. An apparatus comprising a memory configured to store video data and a processor configured to process the video data according to any of examples 24 to 26.

Example 28. The apparatus of example 27, wherein the apparatus includes an encoder.

Example 29. The apparatus of example 27, wherein the apparatus includes a decoder.

Example 30. The apparatus of any one of examples 27 to 29, wherein the apparatus is a mobile device.

Example 31. The apparatus of any one of examples 27 to 30, further comprising a display configured to display the video data.

Example 32. The apparatus of any one of examples 27 to 31, further comprising a camera configured to capture one or more pictures.

Example 33. A computer readable medium having stored thereon instructions that when executed by a processor perform the methods of any of examples 24 to 26.

Example 34. An apparatus for processing video data, the apparatus comprising: one or more memory units storing instructions; and one or more processors that execute the instructions, wherein execution of the instructions by the one or more processors causes the one or more processors to: obtain a current picture and a reference picture; identify filter index information for a current block of the current picture; determine that a first picture size value of the current picture and a second picture size value of the reference picture are different; and based on a determination that the first picture size value of the current picture and the second picture size value of the reference picture are different, perform a resampling process without using a current filter index identified by the filter index information.

Example 35. An apparatus for processing video data, the apparatus comprising: one or more memory units storing instructions; and one or more processors that execute the instructions, wherein execution of the instructions by the one or more processors causes the one or more processors to: obtain a current picture and a reference picture; identify filter index information for a current block of the current picture; determine that a first picture size value of the current picture and a second picture size value of the reference picture are different; and based on a determination that the first picture size value of the current picture and the second picture size value of the reference picture are different, perform a sample rate conversion process using a default filter index (e.g., a default index value) in place of a current filter index identified by the filter index information.

Example 36. The apparatus of any one of examples 34 or 35, wherein the execution of the instructions by the one or more processors further causes the one or more processors to: store the current filter index identified by the filter index information with the current block; and use the current filter index in motion vector candidate derivation for a subsequent block based on the current filter index being identified by the filter index information.

Example 37. The apparatus of any one of examples 34 or 35, wherein the execution of the instructions by the one or more processors further causes the one or more processors to: assign a default value for the current filter index to replace an original value on a temporary basis when the sample rate conversion process is performed without using the current filter index to create the default filter index; and assign the original value for the current filter index after the sample rate conversion process.

Example 38. The apparatus of example 37, wherein the default value for the current filter index indicates that alternative switchable filtering is not applied as part of the resampling process.

Example 39. The apparatus of any one of examples 34 to 38, wherein the filter index information comprises neighbor block information; and wherein the current filter index is derived from the neighbor block information during a merge mode motion vector candidate list derivation.

Example 40. The apparatus of e any one of examples 34 to 39, wherein the filter index information comprises adaptive motion vector resolution (AMVR) mode signaling; and wherein the current filter index is signaled though the AMVR mode signaling.

Example 41. The apparatus of any one of examples 34 to 40, wherein the sample rate conversion process is a motion compensation process.

Example 42. The apparatus of any one of examples 34 to 41, wherein the sample rate conversion process includes resampling process.

Example 43. The apparatus of any one of examples 34 to 42, wherein the sample rate conversion process includes an interpolation process.

Example 44. The apparatus of any one of examples 34 to 43, wherein the execution of the instructions by the one or more processors further causes the one or more processors to use the reference picture for inter-prediction of the current block of the current picture.

Example 45. The apparatus of any one of examples 34 to 44, wherein the execution of the instructions by the one or more processors further causes the one or more processors to: determine that the current filter index is not used for the sample rate conversion process; and replace a value of the current filter index with a default value in response to the determining that the current filter index is not used for the sample rate conversion process.

Example 46. The apparatus of any one of examples 34 to 45, wherein the execution of the instructions by the one or more processors further causes the one or more processors to process the default value to determine that an alternative switchable filter is not applied.

Example 47. The apparatus of example 46, wherein the alternative switchable filter is a smoothing filter.

Example 48. The apparatus of any one of examples 34 to 47, wherein a current filter index value is not signaled in response to a determination that the current filter index is not used in the sample rate conversion process.

Example 49. The apparatus of any one of examples 34 to 48, wherein the current filter index is selected from a set of filters, wherein a subset of the set of filters are used for performing the sample rate conversion process, and wherein a remaining portion of the set of filters are not usable for sample rate conversion.

Example 50. The apparatus of any one of example 49, wherein the current filter index is selected using a syntax element indicating that selection of the current filter index from the remaining portion of the set of filters is prohibited.

Example 51. The apparatus of any one of examples 34 to 50, wherein the sample rate conversion process includes a resampling process, and wherein the execution of the instructions by the one or more processors further causes the one or more processors to: identify a first group of filters for interpolation, and a second group of filters for resampling, wherein the current filter index is from the second group of filters.

Example 52. The apparatus of example 51, wherein the execution of the instructions by the one or more processors further causes the one or more processors to: obtain a second current picture and a second reference picture; determine that a third picture size value of the second current picture and a fourth picture size value of the second reference picture are a same size value; and based on determining that the third picture size value of the second current picture and the fourth picture size value of the second reference picture are the same size value, perform a second resampling process for a second current block using a second selected filter, wherein the second selected filter is from the first group of filters.

Example 53. The apparatus of any one of examples 51 or 52, wherein each filter of the first group of filters and the second group of filters is identified by an associated filter index, the associated filter index indicating an associated index value from a filter set for interpolation or a filter set for resampling.

Example 54. The apparatus of any one of examples 51 to 53, wherein the execution of the instructions by the one or more processors further causes the one or more processors to: obtain the current filter index from a filter index by a lookup operation for a selected filter index value; wherein the selected filter index value is associated with the second group of filters; and wherein association between the selected filter index value and the second group of filters is based on determining that the first picture size value and the second picture size value are different.

Example 55. The apparatus of any one of examples 34 to 54, wherein determining that the first picture size value of the current picture and the second picture size value of the reference picture are different comprises determining at least one of: a current picture width is different from a reference picture width; and a current picture height is different from a reference picture height.

Example 56. The apparatus of any one of examples 34 to 55, wherein the execution of the instructions by the one or more processors further causes the one or more processors to generate an encoded video bitstream comprising the current picture and the reference picture.

Example 57. The apparatus of example 56, wherein the execution of the instructions by the one or more processors further causes the one or more processors to send the encoded video bitstream to a decoding device, the encoded video bitstream being sent with signaling information, the signaling information comprising the default filter index.

Example 58. The apparatus of any one of examples 56 or 57, wherein the execution of the instructions by the one or more processors further causes the one or more processors to store the encoded video bitstream.

Example 59. The apparatus of any one of examples 56 to 58, wherein the execution of the instructions by the one or more processors further causes the one or more processors to: obtaining an encoded video bitstream comprising the current picture and the reference picture; identifying signaling information associated with the encoded video bitstream, the signaling information comprising the filter index information; and decoding the current block of the current picture from the encoded video bitstream.

Example 60. The apparatus of any one of examples 34 to 55, wherein decoding the current block of the current picture from the encoded video bitstream comprises reconstructing the current block based on the default filter index.

Example 61. The apparatus of any one of examples 34 to 60, wherein the apparatus is a mobile device.

Example 62. The apparatus of any one of examples 34 to 61, wherein the apparatus includes a display configured to display the video data.

Example 63. The apparatus of any one of examples 34 to 62, wherein the apparatus includes a camera configured to capture one or more video frames of the video data.

Example 64. A method according to any of examples 34 to 63 above.

Example 65. A non-transitory computer readable storage medium comprising instructions that, when executed by a device, cause the device to perform operations in accordance with any of examples 34 to 63 above.

Example 66. An apparatus including means for performing any operation according to examples 34 to 63 above.

What is claimed is:

1. A method of processing video data, the method comprising:
   obtaining a current picture and a reference picture;
   identifying filter index information for a current block of the current picture;
   determining that a first picture size value of the current picture and a second picture size value of the reference picture are different; and
   based on determining that the first picture size value of the current picture and the second picture size value of the reference picture are different, performing a sample rate conversion process on at least one of the current picture or the reference picture using a default filter index in place of a current filter index identified by the filter index information.

2. The method of claim 1, further comprising:
   storing the current filter index identified by the filter index information with the current block; and
   using the current filter index in motion vector candidate derivation for a subsequent block based on the current filter index being identified by the filter index information.

3. The method of claim 1, further comprising:
   assigning a default value for the current filter index to replace an original value when the sample rate conversion process is performed without using the current filter index to create the default filter index; and
   assigning the original value for the current filter index after the sample rate conversion process.

4. The method of claim 3, wherein the default value for the current filter index indicates that switchable filtering is not applied as part of the sample rate conversion process.

5. The method of claim 1, wherein the filter index information comprises neighbor block information, and wherein the current filter index is derived from the neighbor block information during a merge mode motion vector candidate list derivation.

6. The method of claim 1, wherein the filter index information comprises adaptive motion vector resolution (AMVR) mode signaling, and wherein the current filter index is signaled though the AMVR mode signaling.

7. The method of claim 1, wherein the sample rate conversion process includes a resampling process.

8. The method of claim 1, wherein the sample rate conversion process includes an interpolation process.

9. The method of claim 1, further comprising using the reference picture for inter-prediction of the current block of the current picture.

10. The method of claim 1, further comprising:
determining that the current filter index is not used for the sample rate conversion process; and
replacing a value of the current filter index with a default value in response to determining that the current filter index is not used for the sample rate conversion process.

11. The method of claim 10, further comprising:
processing the default value to determine that an alternative switchable filter is not applied.

12. The method of claim 11, wherein the alternative switchable filter is a smoothing filter.

13. The method of claim 1, wherein a current filter index value is not signaled in response to a determination that the current filter index is not used in the sample rate conversion process.

14. The method of claim 1, wherein the current filter index is selected from a set of filters, wherein a subset of the set of filters are used for performing the sample rate conversion process, and wherein a remaining portion of the set of filters are not usable for sample rate conversion.

15. The method of claim 14, wherein the current filter index is selected using a syntax element indicating that selection of the current filter index from the remaining portion of the set of filters is prohibited.

16. The method of claim 1, wherein the sample rate conversion process includes a resampling process, and further comprising:
identifying a first group of filters for interpolation, and a second group of filters for resampling, wherein the current filter index is from the second group of filters.

17. The method of claim 16, further comprising:
obtaining a second current picture and a second reference picture;
determining that a third picture size value of the second current picture and a fourth picture size value of the second reference picture are a same size value; and
based on determining that the third picture size value of the second current picture and the fourth picture size value of the second reference picture are the same size value, performing a second resampling process for a second current block using a second selected filter, wherein the second selected filter is from the first group of filters.

18. The method of claim 16, wherein each filter of the first group of filters and the second group of filters is identified by an associated filter index, the associated filter index indicating an associated index value from a filter set for interpolation or a filter set for resampling.

19. The method of claim 16, further comprising:
obtaining the current filter index from a filter index by a lookup operation for a selected filter index value;
wherein the selected filter index value is associated with the second group of filters; and
wherein association between the selected filter index value and the second group of filters is based on determining that the first picture size value and the second picture size value are different.

20. The method of claim 1, wherein determining that the first picture size value of the current picture and the second picture size value of the reference picture are different comprises determining at least one of:
a current picture width is different from a reference picture width; and
a current picture height is different from a reference picture height.

21. The method of claim 1, further comprising:
generating an encoded video bitstream comprising the current picture and the reference picture.

22. The method of claim 21, further comprising:
sending the encoded video bitstream to a decoding device, the encoded video bitstream being sent with signaling information, the signaling information comprising the default filter index.

23. The method of claim 21, further comprising:
storing the encoded video bitstream.

24. The method of claim 1, further comprising:
obtaining an encoded video bitstream comprising the current picture and the reference picture;
identifying signaling information associated with the encoded video bitstream, the signaling information comprising the filter index information; and
decoding the current block of the current picture from the encoded video bitstream.

25. The method of claim 24, wherein decoding the current block of the current picture from the encoded video bitstream comprises reconstructing the current block based on the default filter index.

26. An apparatus for processing video data, the apparatus comprising:
one or more memory units storing instructions; and
one or more processors that execute the instructions, wherein execution of the instructions by the one or more processors causes the one or more processors to:
obtain a current picture and a reference picture;
identify filter index information for a current block of the current picture;
determine that a first picture size value of the current picture and a second picture size value of the reference picture are different; and
based on a determination that the first picture size value of the current picture and the second picture size value of the reference picture are different, perform a sample rate conversion process on at least one of the current picture or the reference picture using a default filter index in place of a current filter index identified by the filter index information.

27. The apparatus of claim 26, wherein the execution of the instructions by the one or more processors further causes the one or more processors to:
store the current filter index identified by the filter index information with the current block; and use the current filter index in motion vector candidate derivation for a subsequent block based on the current filter index being identified by the filter index information.

28. The apparatus of claim 26, wherein the execution of the instructions by the one or more processors further causes the one or more processors to:
  assign a default value for the current filter index to replace an original value when the sample rate conversion process is performed without using the current filter index to create the default filter index; and
  assign the original value for the current filter index after the sample rate conversion process.

29. The apparatus of claim 28, wherein the default value for the current filter index indicates that switchable filtering is not applied as part of the sample rate conversion process.

30. The apparatus of claim 26, wherein the filter index information comprises neighbor block information, and wherein the current filter index is derived from the neighbor block information during a merge mode motion vector candidate list derivation.

31. The apparatus of claim 26, wherein the filter index information comprises adaptive motion vector resolution (AMVR) mode signaling, and wherein the current filter index is signaled though the AMVR mode signaling.

32. The apparatus of claim 26, wherein the sample rate conversion process includes a resampling process.

33. The apparatus of claim 26, wherein the sample rate conversion process includes an interpolation process.

34. The apparatus of claim 26, wherein the execution of the instructions by the one or more processors further causes the one or more processors to use the reference picture for inter-prediction of the current block of the current picture.

35. The apparatus of claim 26, wherein the execution of the instructions by the one or more processors further causes the one or more processors to:
  determine that the current filter index is not used for the sample rate conversion process; and
  replace a value of the current filter index with a default value in response to determining that the current filter index is not used for the sample rate conversion process.

36. The apparatus of claim 35, wherein the execution of the instructions by the one or more processors further causes the one or more processors to process the default value to determine that an alternative switchable filter is not applied.

37. The apparatus of claim 36, wherein the alternative switchable filter is a smoothing filter.

38. The apparatus of claim 26, wherein a current filter index value is not signaled in response to a determination that the current filter index is not used in the sample rate conversion process.

39. The apparatus of claim 26, wherein the current filter index is selected from a set of filters, wherein a subset of the set of filters are used for performing the sample rate conversion process, and wherein a remaining portion of the set of filters are not usable for sample rate conversion.

40. The apparatus of claim 39, wherein the current filter index is selected using a syntax element indicating that selection of the current filter index from the remaining portion of the set of filters is prohibited.

41. The apparatus of claim 26, wherein the sample rate conversion process includes a resampling process, and wherein the execution of the instructions by the one or more processors further causes the one or more processors to:
  identify a first group of filters for interpolation, and a second group of filters for resampling, wherein the current filter index is from the second group of filters.

42. The apparatus of claim 41, wherein the execution of the instructions by the one or more processors further causes the one or more processors to:
  obtain a second current picture and a second reference picture;
  determine that a third picture size value of the second current picture and a fourth picture size value of the second reference picture are a same size value; and
  based on determining that the third picture size value of the second current picture and the fourth picture size value of the second reference picture are the same size value, perform a second resampling process for a second current block using a second selected filter, wherein the second selected filter is from the first group of filters.

43. The apparatus of claim 41, wherein each filter of the first group of filters and the second group of filters is identified by an associated filter index, the associated filter index indicating an associated index value from a filter set for interpolation or a filter set for resampling.

44. The apparatus of claim 26, wherein the execution of the instructions by the one or more processors further causes the one or more processors to:
  obtain the current filter index from a filter index by a lookup operation for a selected filter index value;
  wherein the selected filter index value is associated with a second group of filters; and
  wherein association between the selected filter index value and the second group of filters is based on determining that the first picture size value and the second picture size value are different.

45. The apparatus of claim 26, wherein determining that the first picture size value of the current picture and the second picture size value of the reference picture are different comprises determining at least one of:
  a current picture width is different from a reference picture width; and
  a current picture height is different from a reference picture height.

46. The apparatus of claim 26, wherein execution of the instructions by the one or more processors causes the one or more processors to:
  generate an encoded video bitstream comprising the current picture and the reference picture.

47. The apparatus of claim 46, wherein execution of the instructions by the one or more processors causes the one or more processors to:
  send the encoded video bitstream to a decoding device, the encoded video bitstream being sent with signaling information, the signaling information comprising the default filter index.

48. The apparatus of claim 46, wherein execution of the instructions by the one or more processors causes the one or more processors to:
  store the encoded video bitstream.

49. The apparatus of claim 26, wherein execution of the instructions by the one or more processors causes the one or more processors to:
  obtain an encoded video bitstream comprising the current picture and the reference picture;
  identify signaling information associated with the encoded video bitstream, the signaling information comprising the filter index information; and decode the current block of the current picture from the encoded video bitstream.

50. The apparatus of claim 49, wherein decoding the current block of the current picture from the encoded video bitstream comprises reconstructing the current block based on the default filter index.

51. The apparatus of claim 26, wherein the apparatus is a mobile device.

52. The apparatus of claim 26, wherein the apparatus includes a display configured to display the video data.

53. The apparatus of claim 26, wherein the apparatus includes a camera configured to capture one or more video frames of the video data.

* * * * *